US007286251B2

(12) United States Patent
Tomida et al.

(10) Patent No.: US 7,286,251 B2
(45) Date of Patent: Oct. 23, 2007

(54) PERIPHERAL DEVICE, PRINTING APPARATUS, DATA ACQUISITION METHOD, PRINT SUPPORT METHOD, PRINT SUPPORT SYSTEM, PORTABLE COMMUNICATION TERMINAL, AND PRINTING METHOD

(75) Inventors: Takahiro Tomida, Hamura (JP); Koji Nishimoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 506 days.

(21) Appl. No.: 09/940,822

(22) Filed: Aug. 27, 2001

(65) Prior Publication Data

US 2002/0054345 A1    May 9, 2002

(30) Foreign Application Priority Data

| Aug. 29, 2000 | (JP) | ............................. 2000-258591 |
| Sep. 29, 2000 | (JP) | ............................. 2000-298617 |
| Sep. 29, 2000 | (JP) | ............................. 2000-298753 |
| Dec. 27, 2000 | (JP) | ............................. 2000-398325 |

(51) Int. Cl.
  *G06F 15/00* (2006.01)
(52) U.S. Cl. .................. 358/1.15; 379/29.1; 379/32.05; 379/88.13; 379/88.17; 379/100.02; 379/142.06
(58) Field of Classification Search ............... 358/1.15; 379/29.1, 32.05, 88.13, 88.17, 100.02, 142.06
See application file for complete search history.

(56) References Cited

U.S. PATENT DOCUMENTS

| 5,228,118 | A | * | 7/1993 | Sasaki ....................... 358/1.13 |
| 5,467,709 | A | * | 11/1995 | Salomon ....................... 101/93 |
| 6,167,469 | A | * | 12/2000 | Safai et al. ..................... 710/62 |
| 6,348,972 | B1 | * | 2/2002 | Taniguchi et al. .......... 358/1.15 |
| 6,405,049 | B2 | * | 6/2002 | Herrod et al. ............... 455/517 |
| 6,493,104 | B1 | * | 12/2002 | Cromer et al. ............. 358/1.15 |
| 6,553,240 | B1 | * | 4/2003 | Dervarics .................... 455/566 |
| 6,681,120 | B1 | * | 1/2004 | Kim ........................ 455/556.1 |
| 6,779,019 | B1 | * | 8/2004 | Mousseau et al. .......... 709/206 |

FOREIGN PATENT DOCUMENTS

| JP | 05-108522 A | 4/1993 |
| JP | 09-046294 A | 2/1997 |
| JP | 11-195070 A | 7/1999 |
| JP | 2000-207145 A | 7/2000 |

\* cited by examiner

*Primary Examiner*—Aung S. Moe
*Assistant Examiner*—Peter K. Huntsinger
(74) *Attorney, Agent, or Firm*—Frishauf, Holtz, Goodman & Chick, P.C.

(57) ABSTRACT

A printer is connected to a portable communication terminal which is accessible to a server device on a network. The printer comprises an interface connected to the portable communication terminal, and an access device accessing to the server device by a circuit connection function of the portable communication terminal and downloading data registered in advance in the server device by the portable communication terminal.

2 Claims, 25 Drawing Sheets

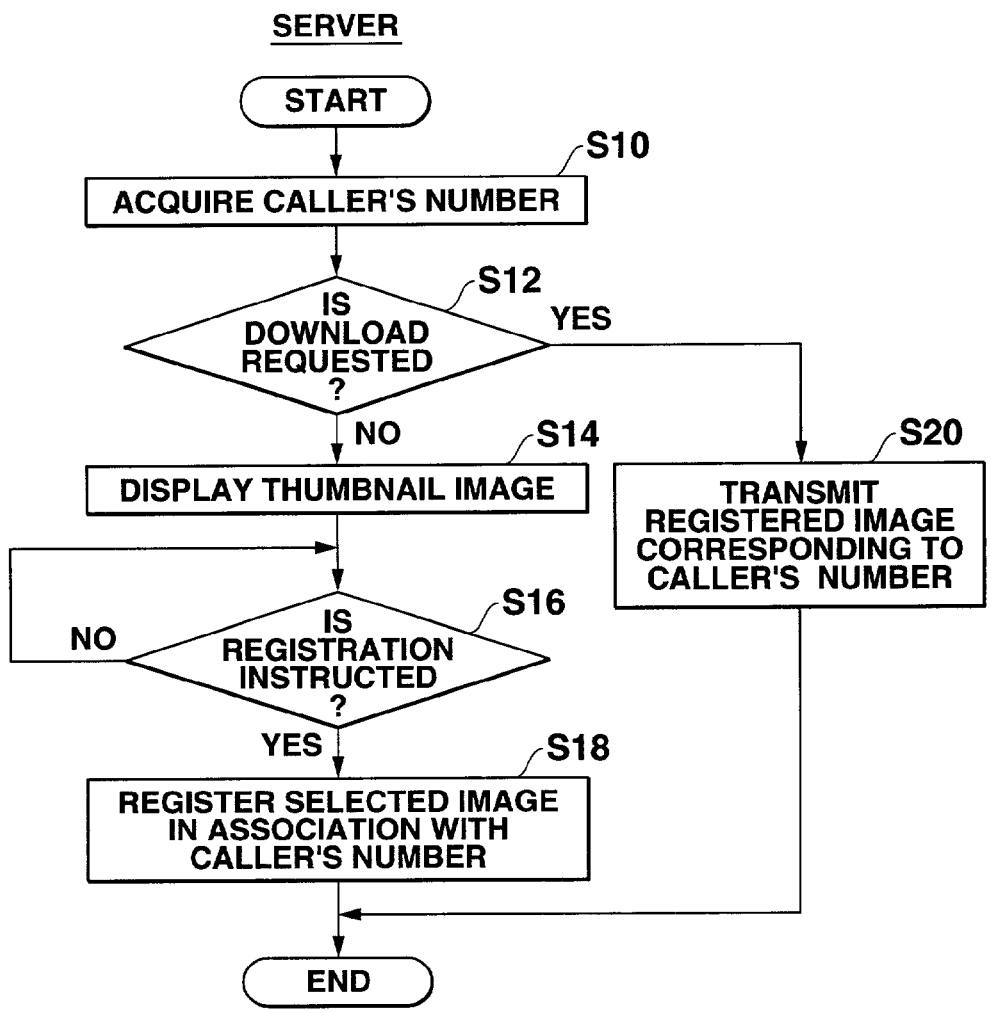

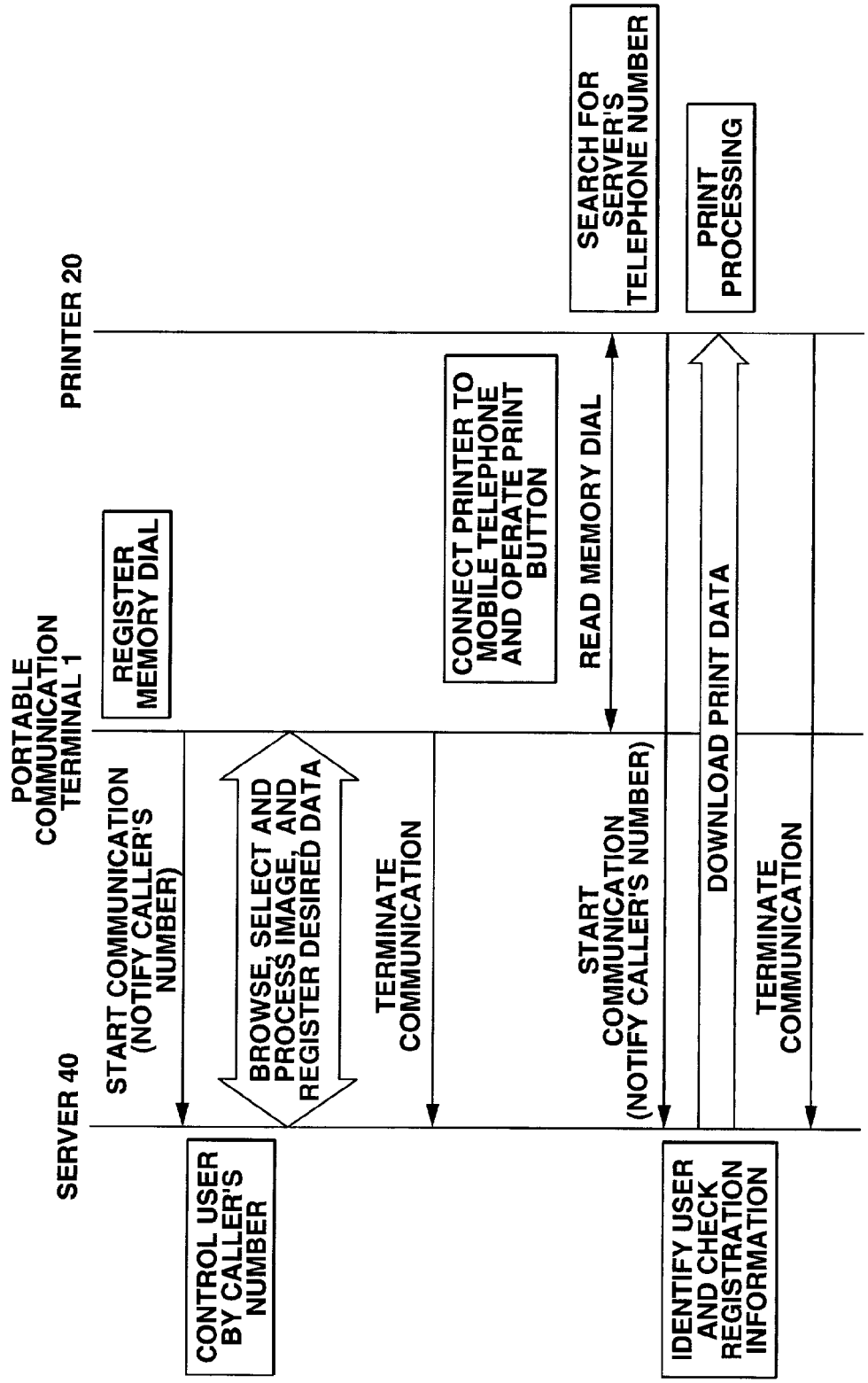

1 ACQUIRE PRINT OBJECT DATA
2 RECEIVE PRINT OBJECT DATA
3 SELECT PRINTER
4 PRINT

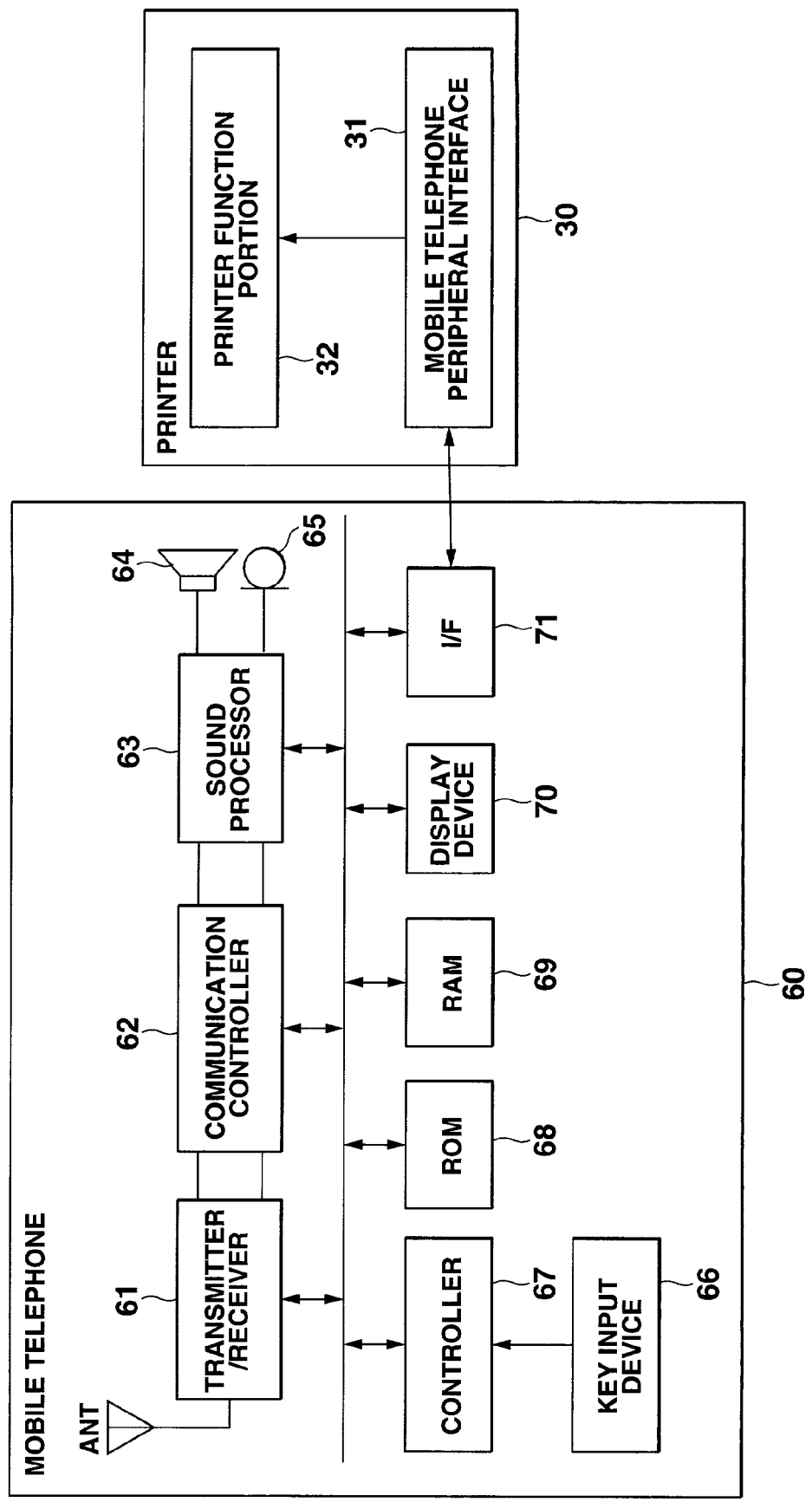

FIG.18

| NUMBER OF PIXELS FOR PRINT IMAGE DATA | SIZE OF PRINT (nm) | |
| --- | --- | --- |
| | PRINTER RESOLUTION (DPI) | |
| | 200 | 400 |
| 640 X 480 | 81.3 X 61.0 | 162.6 X 122.0 |
| 320 X 240 | 40.6 X 30.5 | 81.3 X 61.0 |
| 160 X 120 | 20.3 X 15.2 | 40.6 X 30.5 |

FIG.19A

1 NUMBER OF CHARACTER PER LINE
2 NUMBER OF LINES
3 FONT TYPE
4 FONT SIZE

THIS IS AN IMAGE PRINTED BY UTILIZING PRINT | SERVICE FROM MOBILE TELEPHONE

FIG.19C

THIS IS AN IMAGE | PRINTED BY UTILIZING

FIG.20A

| FORM SIZE |
|---|
| 1　A4 |
| 2　B4 |

FIG.20B

| |
|---|
| 1　NUMBER OF LINES PER PAGE |
| 2　NUMBER OF CHARACTERS PER LINE |
| 3　MARGIN |
| 4　FONT TYPE |
| 5　FONT SIZE |

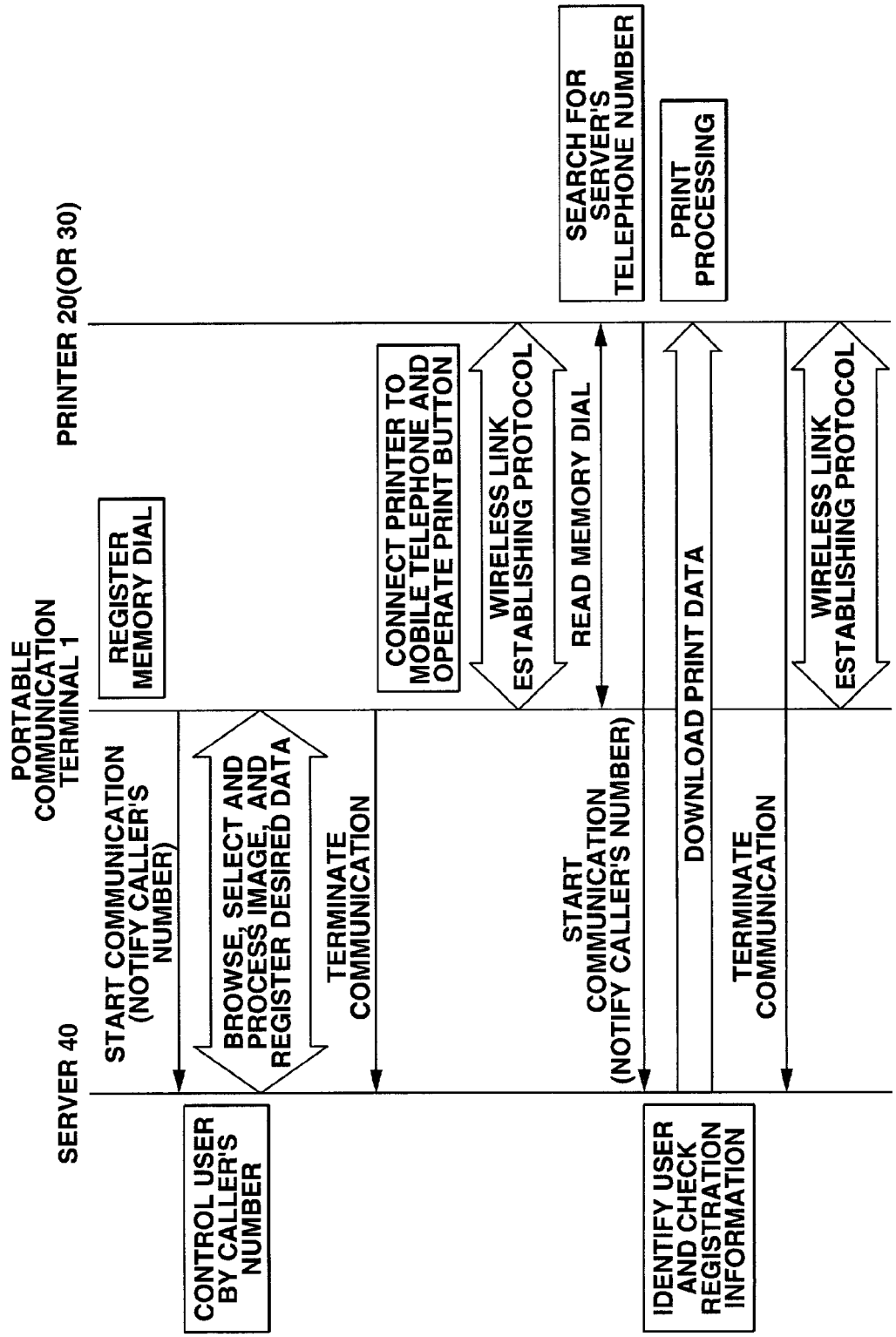

PERIPHERAL DEVICE, PRINTING APPARATUS, DATA ACQUISITION METHOD, PRINT SUPPORT METHOD, PRINT SUPPORT SYSTEM, PORTABLE COMMUNICATION TERMINAL, AND PRINTING METHOD

CROSS-REFERENCE TO RELATED APPLICATIONS

This application is based upon and claims the benefit of priority from the prior Japanese Patent Applications No. 2000-258591, filed Aug. 29, 2000, No. 2000-298617, filed Sep. 29, 2000, No. 2000-298753, filed Sep. 29, 2000, and No. 2000-398325, filed Dec. 27, 2000, the entire contents of all of which are incorporated herein by reference.

BACKGROUND OF THE INVENTION

1. Field of the Invention

The present invention relates to a peripheral device, a printing apparatus, a data acquisition method, a print support method, a print support system, a portable communication terminal, and a printing method that support printing data provided from a server device via a network by a portable data processing terminal.

2. Description of the Related Art

In recent years, in a portable communication terminal such as a mobile telephone or a PHS (Personal Handyphone System) terminal, there is provided a technique for capturing character data or image data and the like provided by Web servers through Internet, thereby browsing the data by a browser. Such a portable communication terminal comprises a display device (a liquid crystal display) and its required minimal input device (key switches) because of its compactness, but does not comprise a printer.

In the meantime, a peripheral interface for connecting a peripheral device to a downstream of the terminal is provided at the above described portable communication terminal. The peripheral interface is designed on the assumption that the portable communication terminal is merely employed as a communication device (or a modem). Therefore, to the peripheral interface, a PDA (personal digital assistant), digital camera or a data processing unit such as a portable computer (a notebook type or book type computer) that do not have a communication function is connected as a peripheral device.

In this case, the portable communication terminal merely operates as a communication device, and data is transmitted and received between a data processing unit that is a peripheral device and a server on Internet. That is, the peripheral device is capable of receiving general-purpose data via the peripheral interface of the portable communication terminal. By this connection, for example, the data inputted by the data processing unit can be transmitted to a remote site via the mobile telephone through E-mail.

In contrast, if the portable communication terminal itself operates as a data processing terminal, and browses server's character data or image data over Internet, it is not possible to transmit general-purpose data excluding specific data such as memory dial data or E-mail data to a peripheral device via a peripheral interface. The memory dial used here denotes a function for registering a telephone number and a name as a telephone directory.

If a user attempts to print the character data or image data and the like browsed on the portable communication terminal, it is considered that a printer is connected to the peripheral interface, and the data is printed by the printer. A technique for connecting a printer to a peripheral interface and printing the data by the printer in this way includes: connecting a special printer used exclusively for a specific mobile telephone to the mobile telephone, and then, printing data displayed on a display portion of the mobile telephone by the special printer. The technique is used by connecting the special printer used exclusively for this mobile telephone. Thus, there has been a disadvantage that data cannot be printed unless the specific mobile telephone and the special printer are used. That is, in a general mobile telephone (model incompatible with printer connection), if the mobile telephone itself operates as a data processing terminal, general-purpose data cannot be delivered to the peripheral device via the peripheral interface. Thus, there has been a problem that the general-purpose data cannot be easily printed.

In addition, printable data is only data that can be displayed on the display portion of the mobile telephone, and moreover, the data is printed as the data is displayed, and a complicated function for displaying printable data in an arbitrary layout or format cannot be provided.

The above fact applies to a data processing terminal other than a mobile telephone, and in particular, to a simplified portable data processing terminal comprising a communication function with a network.

In addition, apart from the above described print processing, for example, with respect to music data (such as MP3) as well, even if an attempt is made to reproduce music data downloaded by the portable communication terminal by a reproduction apparatus connected to the peripheral interface, such music data cannot be delivered to the reproduction apparatus. Thus, a problem similar to the above described problem occurs.

BRIEF SUMMARY OF THE INVENTION

It is an object of the present invention to provide a peripheral device, a printing apparatus, a data acquisition method, a print support method, a print support system, a portable communication terminal, and a printing method capable of easily utilizing data browsed on a portable communication terminal by an external device connected to a portable communication terminal, and capable of carrying out printing operation in an arbitrary format set by a user by a printing apparatus connected to the portable communication terminal.

According to one aspect of the present invention, there is provided a peripheral device capable of being connected to a portable communication terminal accessible to a server device on a network, the peripheral device comprising:

an interface configured to be connected to the ortable communication terminal; and an access device configured to access the server device by a circuit connection function of the portable communication terminal and download data registered in the server device by the portable communication terminal.

According to another aspect of the present invention, there is provided a printing apparatus capable of being connected to, as a peripheral device, a portable communication terminal accessible to a server device on a network, the printing apparatus comprising:

an interface configured to be connected to the portable communication terminal;

an access device configured to access the server device by a circuit connection function of the portable communication terminal and download data registered in the server device by the portable communication terminal; and a printer configured to print the data downloaded by the access device.

According to still another aspect of the present invention, there is provided a data acquisition method comprising:

connecting a portable communication terminal to a server device on a network;

registering in the server device data to be acquired by a peripheral device connected to the portable communication terminal which is selected among from browsable data provided by the server device and disconnecting the portable communication terminal from the server device;

connecting the portable communication terminal to the server device by a peripheral device when the peripheral device is connected to the portable communication terminal, using a circuit connection function of the portable communication terminal; and downloading data registered in the server device to the peripheral device.

According to still another aspect of the present invention, there is provided a print support method comprising:

receiving printer identification information for identifying a printer connected to a portable communication terminal from the portable communication terminal via a network;

acquiring data targeted for printing specified by the portable communication terminal;

generating print data for printing the acquired data targeted for printing by the printer based on the printer identification information and the acquired data targeted for printing; and transmitting the generated print data to the portable communication terminal via the network.

According to still another aspect of the present invention, there is provided a print support method comprising:

receiving printer identification information for identifying a printer connected to a portable communication terminal and printing condition for printing data target for printing data targeted for printing from the portable communication terminal via a network;

acquiring the data targeted for printing;

changing the data targeted for printing based on the received printing condition; and transmitting a printer driver corresponding to [a printer specified by] the printer identification information and the changed data targeted for printing to the portable communication terminal via the network.

According to still another aspect of the present invention, there is provided a print support system comprising:

a data processing unit for a print support;

at least one portable communication terminal connected to the data processing unit via a network; and a printer connected to the portable communication terminal, wherein the portable communication terminal comprises:

a transmitter which transmits printer identification information for identifying the printer to the data processing unit; and a device which notifies the data processing unit of data targeted for printing and printing condition, the data processing unit comprises:

a device which acquires the data targeted for printing notified by the portable communication terminal;

a device which changes the acquired data targeted for printing in accordance with the printing condition notified by the portable communication terminal;

a device which generates print data for printing the changed data targeted for printing by the printer based on the changed data targeted for printing and the printer identification information; and a transmitter which transmits the generated print data to the portable communication terminal via the network, and the portable communication terminal further comprises:

a transmitter which transmits the generated print data to the printer.

According to still another aspect of the present invention, there is provided a print support system comprising:

a data processing unit for a print support;

at least one portable communication terminal connected to the data processing unit via a network; and a printer connected to the portable communication terminal, wherein the portable communication terminal comprises:

a transmitter which transmits printer identification information for identifying the printer to the data processing unit; and a device which notifies the data processing unit of data targeted for printing and printing condition, the data processing unit comprises:

a device which acquires the data targeted for printing notified by the portable communication terminal;

a device which changes the acquired data targeted for printing in accordance with the printing condition notified by the portable communication terminal;

a transmitter which transmits a printer driver corresponding to a printer specified by the printer identification information and the changed data targeted for printing to the portable communication terminal via the network, and the portable communication terminal further comprises:

receiver which receives the printer driver and the changed data targeted for printing transmitted from the data processing unit;

a memory which stores the received printer driver and the changed data targeted for printing a device which generates print data for printing the stored changed data targeted for printing by the printer based on the stored changed data targeted for printing by means of the stored printer driver; and a transmitter which transmits the generated print data to the printer.

According to still another aspect of the present invention, there is provided a portable communication terminal capable of accessing to a server device on a network and downloading data provided by the server device, the portable communication terminal comprising:

an interface for connecting an external device;

an acquisition device which acquires from the server device, a data processing program that corresponds to the external device connected to the interface; and a transfer device which processes data downloaded from the server device by means of the data processing program acquired by the acquisition means and transmits the processed data to the external device connected to the interface.

According to still another aspect of the present invention, there is provided a data acquisition method for accessing to a server device on a network by a portable communication terminal and acquiring data provided by the server device by the portable communication terminal, the method comprising:

acquiring the data provided by the server device;

acquiring a data processing program that corresponds to an external device connected to the portable communication terminal from the server device; and processing data provided by the server device by means of the data processing program, and transferring the processed data to the external device connected to the portable communication terminal.

According to still another aspect of the present invention, there is provided a printing method for printing data provided by a server device on a network by a printing apparatus connected to a portable communication terminal for accessing to the server device via the network, the printing method comprising:

downloading a printer driver that corresponds to the printing apparatus from the server device;

changing by the printer driver the data provided by the server device to print data that can be printed by the printing apparatus; and printing the print data by the printing apparatus.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3 is a flow chart illustrating an operation of a print service server;

FIG. 4 is a conceptual view showing image data registered in the print service server;

FIG. 7 is a sequence chart illustrating an operation of the first embodiment;

FIG. 12 is a block diagram showing a schematic configuration of a portable communication terminal and a printer;

FIG. 18 is a view showing a relationship between the number of pixels for print object data and a print size;

FIG. 19A is a view showing the printing condition specification screen;

FIGS. 19B and 19C are views showing the various print results;

FIGS. 20A and 20B are views showing other examples of the printing condition specification screen;

FIG. 29 is a sequence chart showing an execution timing of establishing and disconnecting a wireless link shown in FIGS. 27 and 28 in the case of the first embodiment (FIG. 7);

DETAILED DESCRIPTION OF THE INVENTION

An embodiment of a peripheral device, printing apparatus, data acquisition method, print support method, print support system, portable communication terminal, and printing method according to the present invention will now be described with reference to the accompanying drawings.

FIRST EMBODIMENT

Figure 1:
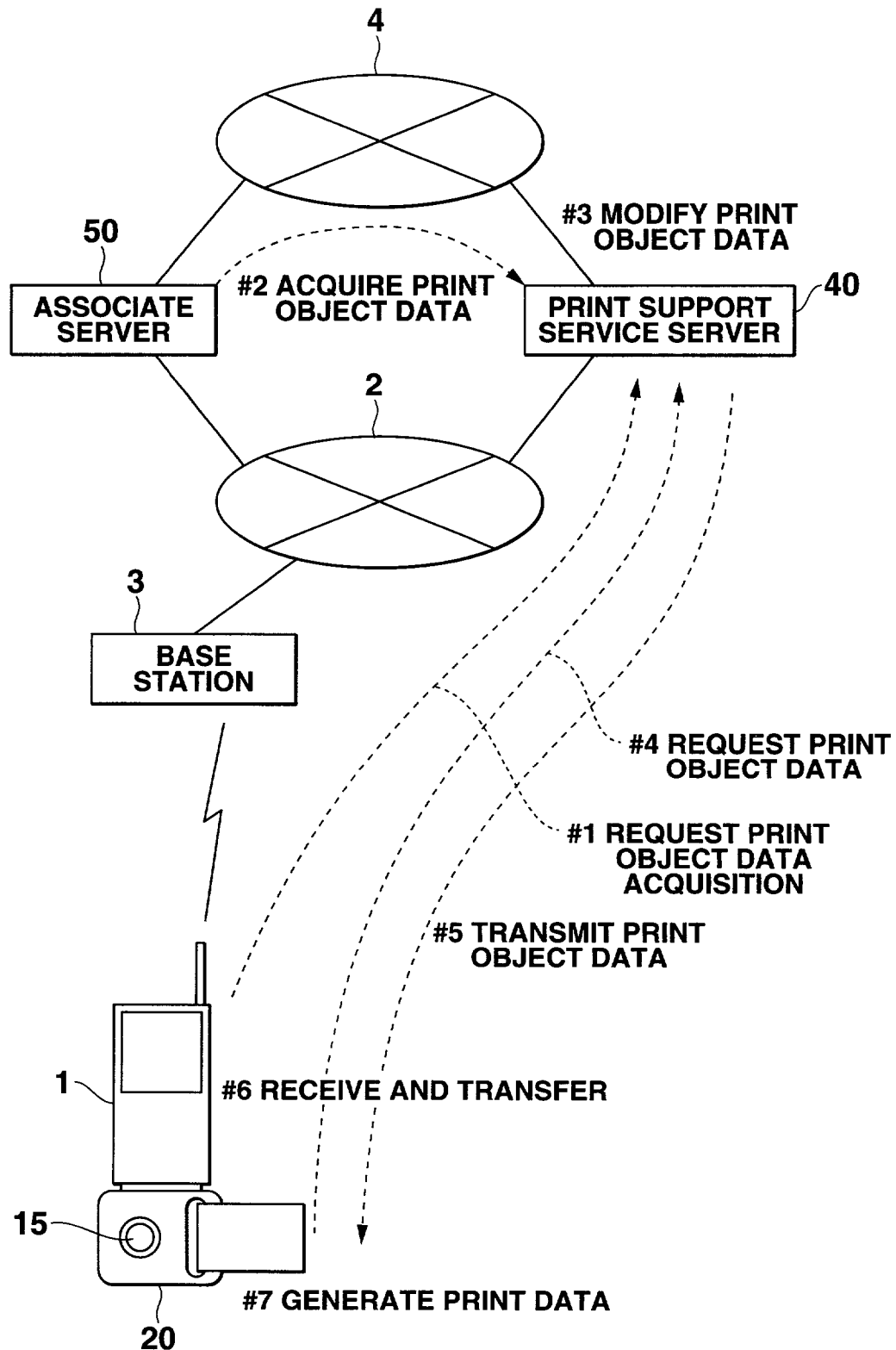
FIG. 1 is a schematic block diagram showing a print support service system according to a first embodiment of the present invention.

FIG. 1 is a schematic block diagram showing a print support system according to the first embodiment of the present invention. A portable communication terminal 1 is utilized by a general user and is an example of a data processing terminal. The portable terminal 1 used here denotes a potable telephone terminal making wireless communication using a telephone circuit. This terminal 1 includes a telephone terminal employing any system such as called a cellular phone or PHS (personal handyphone system). A portable communication terminal 1 comprises a liquid crystal display or dial keys and the like.

The portable communication terminal 1 communicates with a base station 3 via a wireless channel, thereby making conversation or data communication via a mobile communication network 2 such as Internet. In addition, the portable communication terminal 1 accesses to a print support service server 40 via the mobile communication network 2, browses image data provided by the print support service server 40 by a browser, and specifies desired image data for printout.

In addition, the portable communication terminal 1 comprises a peripheral interface (not shown in FIG. 1), and is connectable with a printer 20 that is a peripheral device (described later). The portable communication terminal 1 operates a communication device (or a modem) for accessing to the print support service server 40 via the mobile communication network or a network 4 such as Internet when the printer 20 is connected. A digital camera or music reproduction apparatus (an MP3 player) or the like is connectable with the portable communication terminal 1.

The mobile communication network 2 includes a telephone network (not shown) for communicating with the portable communication terminal 1 via the base station 3 that is a so called wireless telephone base station. More specifically, the mobile communication network 2 includes a wireless transmission/receiving device (not shown) provided at the base station 3, a mobile communication exchange device (not shown) and a general telephone exchange device (not shown) or the like. This network 2 enables communication between a mobile telephone and another mobile telephone or a general subscriber's telephone. The base stations 3 are placed in predetermined intervals in the mobile communication network 2. Each base station 3 is a relay station that has its own service area (radio wave coverage area: communication zone) and wirelessly connects the portable communication terminal 1 that exists in the service area to the mobile communication network 2. The mobile communication network 2 is interconnected with the network 4 such as Internet.

Figure 2A:
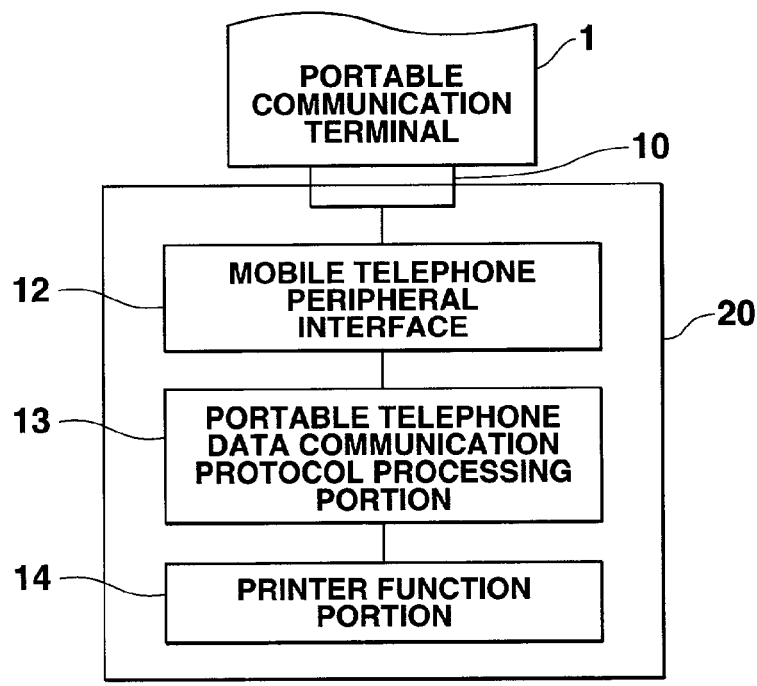
FIGS. 2A and 2B are block diagrams showing examples of a schematic configuration of a printer.
Figure 2B:
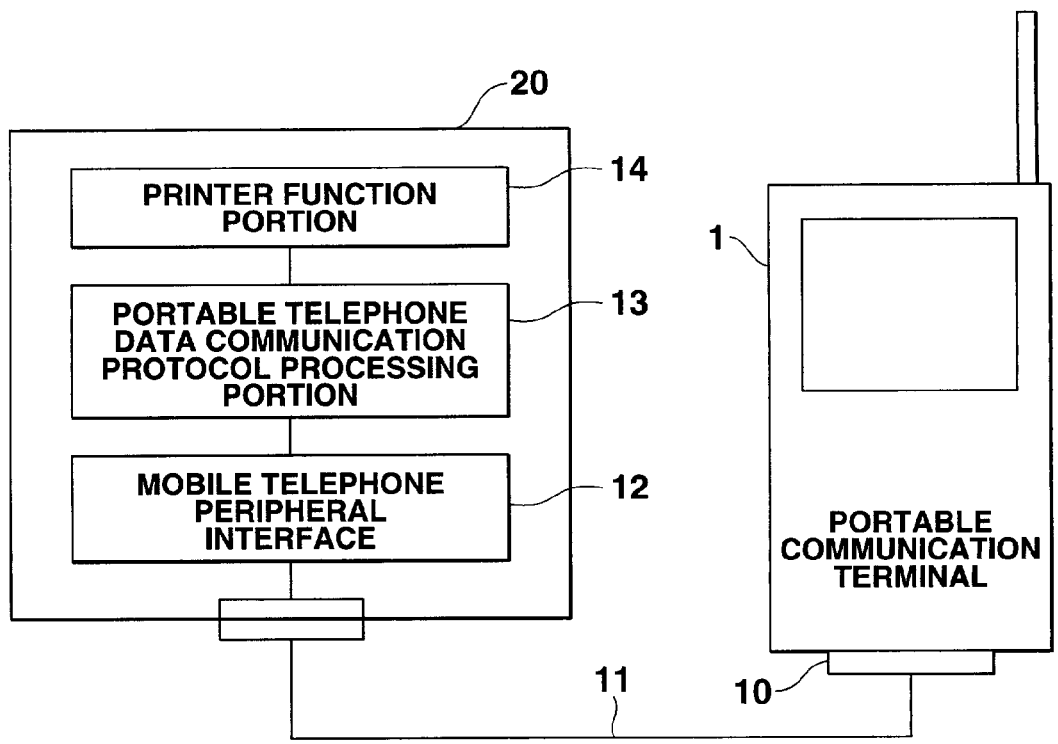

Next, like the portable communication terminal 1, the printer 20 is portable by the user, and is driven by a battery (a primary battery or a secondary battery). FIGS. 2A and 2B are block diagrams showing examples of a schematic configuration of the printer 20. The printer 20 is directly connected to a peripheral interface connector 10 of the portable communication terminal 1, as shown in FIG. 2A or is connected via a predetermined cable 11, as shown in FIG. 2B. As the printer 20, there are employed a monochrome printer, a color printer, and a label printer or the like according to its use. In addition, printable data may include privacy (prominent person) data, stock market data, gamble data, E-mail, and name card data or any other item of data that can be provided from the server side as well as image data.

The printer 20 comprises a mobile telephone peripheral interface 12, mobile telephone data communication protocol processing portion 13, and printer function portion 14, as shown in FIGS. 2A and 2B. The mobile telephone peripheral interface 12 is intended to be connected to a peripheral interface (not shown) of the portable communication terminal 1. The mobile telephone data communication protocol processing portion 13 causes the portable communication terminal 1 to operate as a communication device (modem), and carries out protocol processing for connecting with the print service server 1 via Internet 4. It is desirable that the mobile telephone data communication protocol processing portion 13 be achieved by software in order to absorb communication protocols that differ from each other depending on each manufacturer's portable communication terminal, and is made available by changing software components.

The printer 20 is connected to the portable communication terminal 1. When a print button 15 shown in FIG. 1 is pressed, the printer 20 accesses to the print support service server 40 via the mobile communication network 2 or Internet 4 through the portable communication terminal 1 by the mobile telephone data communication protocol processing portion 13 so as to download image data registered in advance by the portable communication terminal 1. The printer function portion 14 comprises a print mechanism that converts the downloaded image data into print data by its own printer driver, and printing the data on a form.

The print support service server 40 is a print support service server owned by a service company for executing print support service according to the present invention. The print support service server 40 is connected to the mobile communication network 2 via a transmission control portion (not shown), and communicable with the portable terminal 1 via the mobile communication network 2. The print support service server 40 is connected to Internet 4 via a network connection device (not shown) such as a router, for example, and is communicable with another server via Internet 4. In addition, the print support service server 40 has a storage region for storing a number of program routines or a variety of data as described later.

The print support service server 40 provides a plurality of image data so that the image data can be browsed at a terminal incorporating a browser (the portable communication terminal 1 in the present embodiment) via the network 4 such as Internet. Then the accessing portable communication terminal 1 selects a desired item of image data, the print support service tever server 40 registers the selected portable communication terminal 1 and the selected item of image data to be associated with each other. On the other hand, when the print support service server 40 is accessed from the printer 20 that employs the portable communication terminal 1 as a communication device, the registered image data is transmitted to the printer 20. It is managed by a caller's number transmitted from the portable terminal 1 during call origination as to which of the portable communication terminals 1 accesses.

An associate server 50 is connected to Internet 4. The associate server 50 used here denotes a company or person that is associated in advance with an organization who executes a print support service as to provision of data targeted for printing such as image data or document data targeted for print services to the print support service server 40. In the figure, although only one associate server 50 is shown, in general, the associate servers 50 are connected to Internet 4.

In the first embodiment, a print support service is provided to data targeted for printing, primarily provided by the associate server 50. This service can also be provided for data targeted for printing, the data being provided by a server that belongs to a non-associate organization other than associate server 50. Hereinafter, a description is given with respect to execution of print service for the portable communication terminal 1. The present invention is applicable to another simplified mobile telephone such as PHS. Further, the present invention is also applicable to a data processing terminal such as a personal computer having a communication function other than a mobile telephone, and in particular, is suitably applicable to a portable, simplified data processing terminal.

Figure 5:
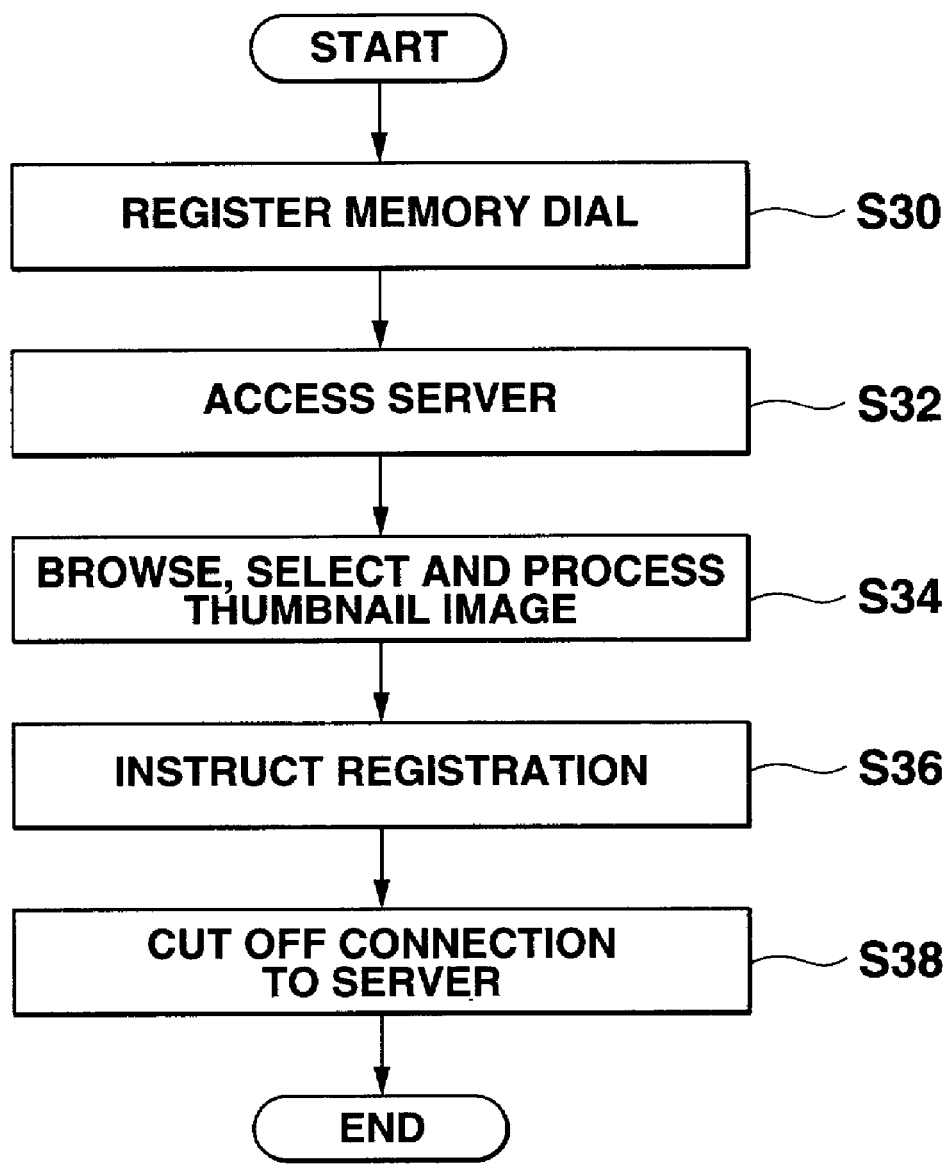
FIG. 5 is a flow chart illustrating an operation of a portable communication terminal.
Figure 6:
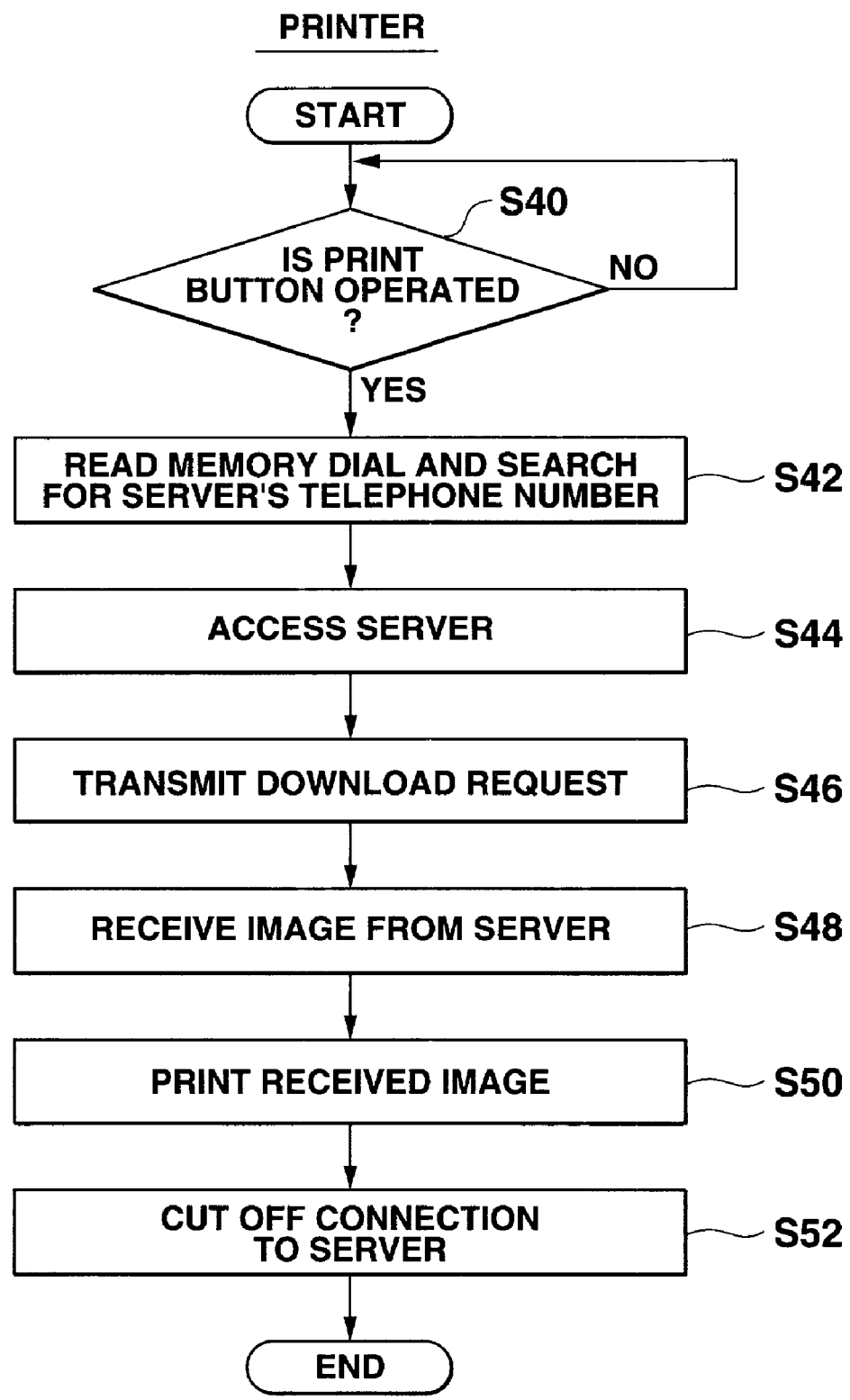
FIG. 6 is a flow chart illustrating a printer operation.

Now, an operation of the above described embodiment will be described here. FIG. 3 is a flow chart illustrating an operation of the print support service server 40. FIG. 4 is a conceptual view showing image data registered in the print support service server 40. FIG. 5 is a flow chart illustrating an operation of the portable communication terminal 1. FIG. 6 is a flow chart illustrating a printer operation.

An operation of the print support service server 40 will be described here. A caller's number is acquired (step S10) when the print support service server 40 is accessed by the portable communication terminal 1, and it is determined whether or not an image data download request is made (step S12). If no download request is made, image data is displayed as thumb nail on the portable communication terminal 1 so that the data can be browsed (step S14). Next, it is determined whether or not the portable communication terminal 1 supplies a register instruction (step S16). When the register instruction is supplied, as shown in FIG. 5, such instruction is associated with the caller's number, and a selected image is registered (step S18). In an example shown in FIG. 5, image data "FILE0001. jpg", "FILE0002. jpg", and "FILE0003. jpg" are registered relevant to the caller's number "090-**-**". On the other hand, if the portable communication terminal 1 makes a download request, the registered image data that corresponds to the caller's number is transmitted to the requested portable communication terminal 1 (step S20).

Now, an operation of the portable communication terminal 1 will be described here. The portable communication terminal 1 first registers a telephone number (and/or URL (Uniform Resource Locator)) for connecting with the print support service server 40 in a memory dial of the portable communication terminal 1 (step S30). The registry name is assigned by a specific character string, for example, "*** print service". Next, the portable communication terminal 1 solely accesses to the print support service server 40 by utilizing the memory dial (step S32). From among a plurality of images provided by the print support service server 40, selection and processing (such as reduction, enlargement, or clipping) of a desired print image item is carried out on the display portion of the portable communication terminal 1 (step S34). Next, a register instruction is supplied to the print support service server 40 (step S36), and then, the portable communication terminal 1 is disconnected from the server 40 (step S38).

Now, an operation of the printer 20 will be described here. In the printer 20, it is determined whether or not the print button 15 is pressed (step S40). When the print button 15 is pressed, a memory dial of the portable terminal 1 read. Then, a specific character string ("*** print service") is searched for, and the telephone number (and/or URL) of the print support service server 40 is acquired (step S42). Then, the printer 20 accesses to the print support service server 40 via the network 4 such as Internet through the portable communication terminal 1 by the mobile telephone data communication protocol processing portion 13 (step S44).

Next, the printer 20 transmits a download request to the print support service server 40 (step S46). The printer 20 receives image data transmitted from the print support service server 40 in response to the download request (step S48). The image data is registered in advance by the portable communication terminal 1. The printer 20 prints out on a form by the printer function portion 14, the image data downloaded from the print support service server 40 (step S50). After the printing has been completed, the printer 20 is temporarily disconnected from the portable communication terminal 1 (step S52).

FIG. 7 is a sequence chart illustrating an entire operation of the above described embodiment. A user first registers the telephone number (and/or URL) for connecting with the print support service server 40 in the memory dial of the portable communication terminal 1. The portable communication terminal 1 is solely connected to the print support service server 40. From among a plurality of image data items provided by the print support service server 40, selection and processing (reduction, enlargement, or clipping) of a desired print image item is carried out at the display portion of the portable communication terminal 1. Thereafter, the portable communication terminal 1 is temporarily disconnected from the print support service server 40. The print support service server 40 manages the caller's number from the portable communication terminal 1 and the selected image data to be associated with each other.

Next, the user connects the portable communication terminal 1 to the printer 20, and presses the print button 15. The printer 20 reads a memory dial from the portable communication terminal 1, searches for a specific character string ("*** print service"), and acquires the telephone number (and/or URL) of the print support service server 40. Then, by the mobile telephone data communication protocol processing portion 13, the printer 20 accesses to the print support service server 40 via Internet 4 through the portable communication terminal 1 in accordance with the acquired telephone number (and/or URL) of the print support service server 40. The printer 20 requests the print support service server 40 to download the image data registered in advance by the portable communication terminal 1.

The print support service server 40 specifies a user (a portable communication terminal 1) according to the caller's number, and transmits the image data registered in advance by the portable communication terminal 1 via the network 4 in response to the download request. The printer 20 prints out on a form by the printer function portion 14, image data downloaded from the print support service server 40. After the printing has been completed, communication between the printer 20 and the print support service server 40 is terminated.

MODIFIED EXAMPLE OF THE FIRST EMBODIMENT

In the above described embodiment, although the printer 20 mounts the peripheral interface 12 for connecting with the portable communication terminal 1 and the mobile telephone data communication protocol processing portion 13 that carries out protocol processing for connecting with the print support service server 40, these peripheral interface 12 and mobile telephone data communication protocol processing portion 13 may be mounted on an adapter connected between the portable communication terminal 1 and the printer 20 without being limited thereto.

Figure 8A:
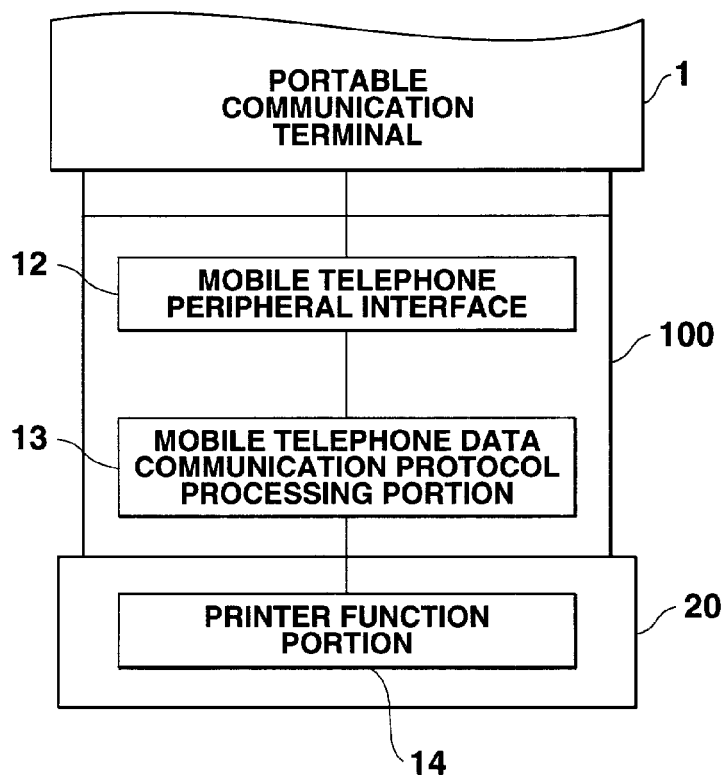
FIGS. 8A and 8B are block diagrams showing modifications of the first embodiment.
Figure 8B:
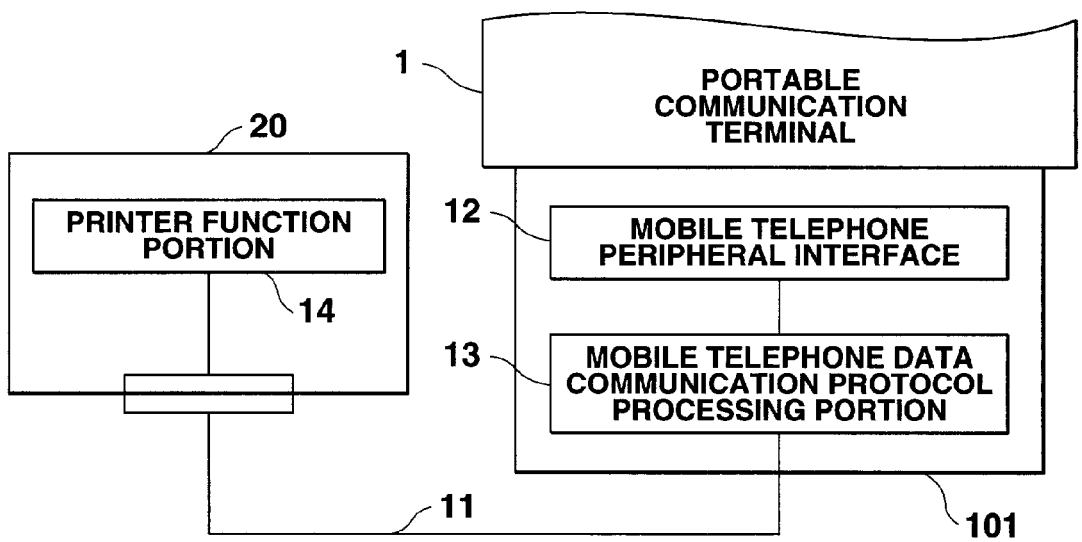

In an example shown in FIG. 8A, when the portable communication terminal 1 and the printer 20 are directly connected with each other, the peripheral interface 12 and mobile telephone data communication protocol processing portion 13 are mounted on an adapter 100 positioned between the portable communication terminal 1 and the printer 20. In an example shown in FIG. 8B, when the portable communication terminal 1 and the printer 20 are connected with each other via the cable 11, the peripheral interface 12 and the mobile telephone data communication protocol processing portion 13 are mounted on an adapter 101 for connecting the cable 11 to the portable communication terminal 1. This makes it possible to ensure cost reduction of the printer 20 itself.

Further, various types of printers can be used with the portable communication terminal 1, since the printer driver converts the downloaded image data into print data for respective printers.

Although the first embodiment has described only the printer 20 as a peripheral device to be connected with the portable communication terminal 1, such peripheral devices is applicable to a reproduction apparatus for reproducing music data, a display device for displaying image data or character data with high resolution and with large screen, and a large capacity storage device having a large storage capacity and storing a variety of data or the like.

Other embodiments of the peripheral device, printing apparatus, data acquisition method, print support method, print support system, portable communication terminal, and printing method according to the present invention will be described. The same portions as those of the first embodiment will be indicated in the same reference numerals and their detailed description will be omitted.

SECOND EMBODIMENT

Figure 9:
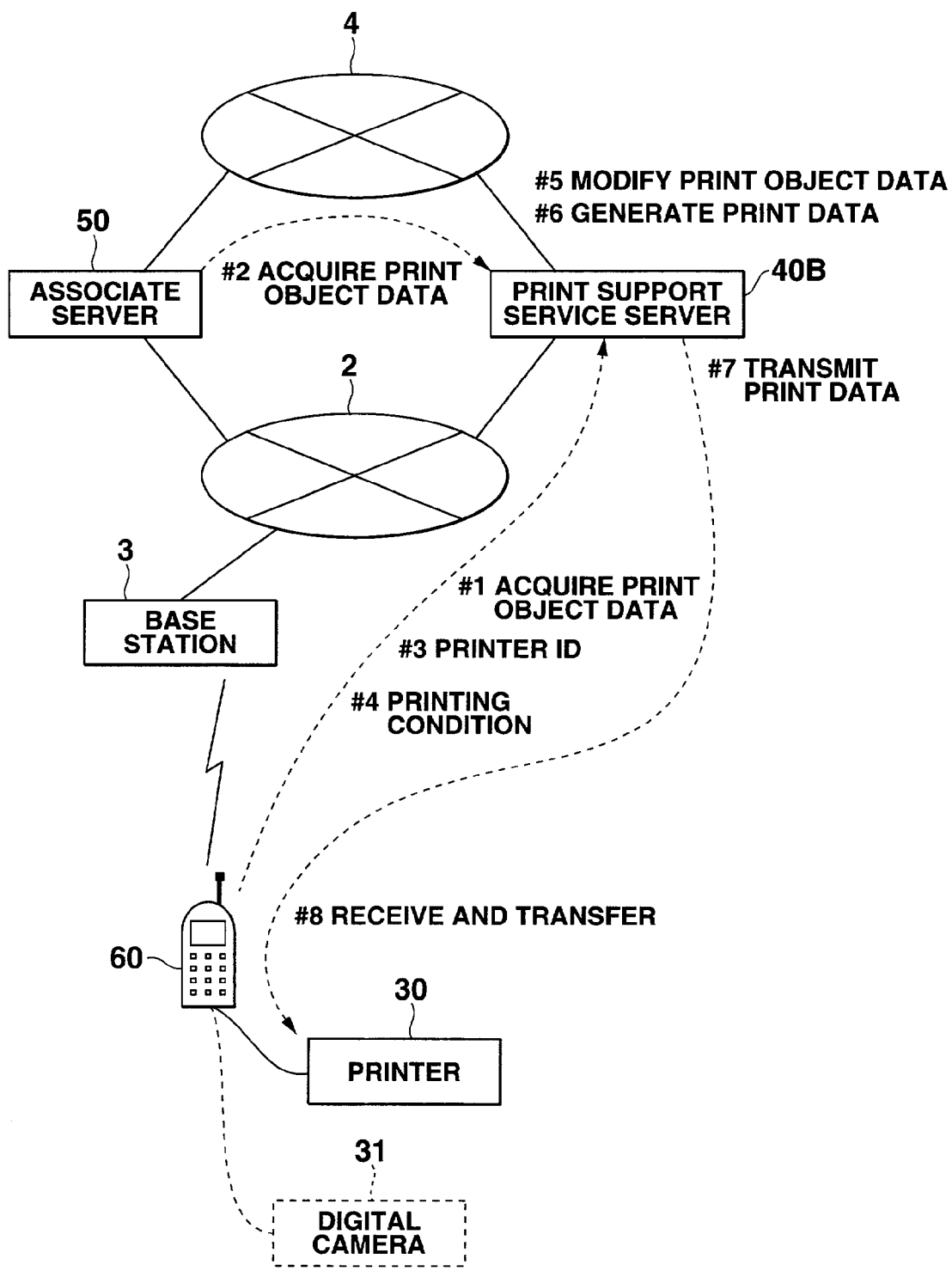
FIG. 9 is a schematic block diagram showing a print support service system according to a second embodiment of the present invention.

FIG. 9 is a schematic block diagram showing a print support system according to the second embodiment of the present invention. In the second embodiment, a print support service server 40B can modify data targeted for printing in accordance with a printing condition (such as a form size or a print format used in the printer 30) specified by a user from a mobile telephone 60. In addition, the print support service server 40B can generate print data to be printed from data targeted for printing after converted by the printer 30, and then, transmit the generated data to the mobile telephone 60.

Figure 11:
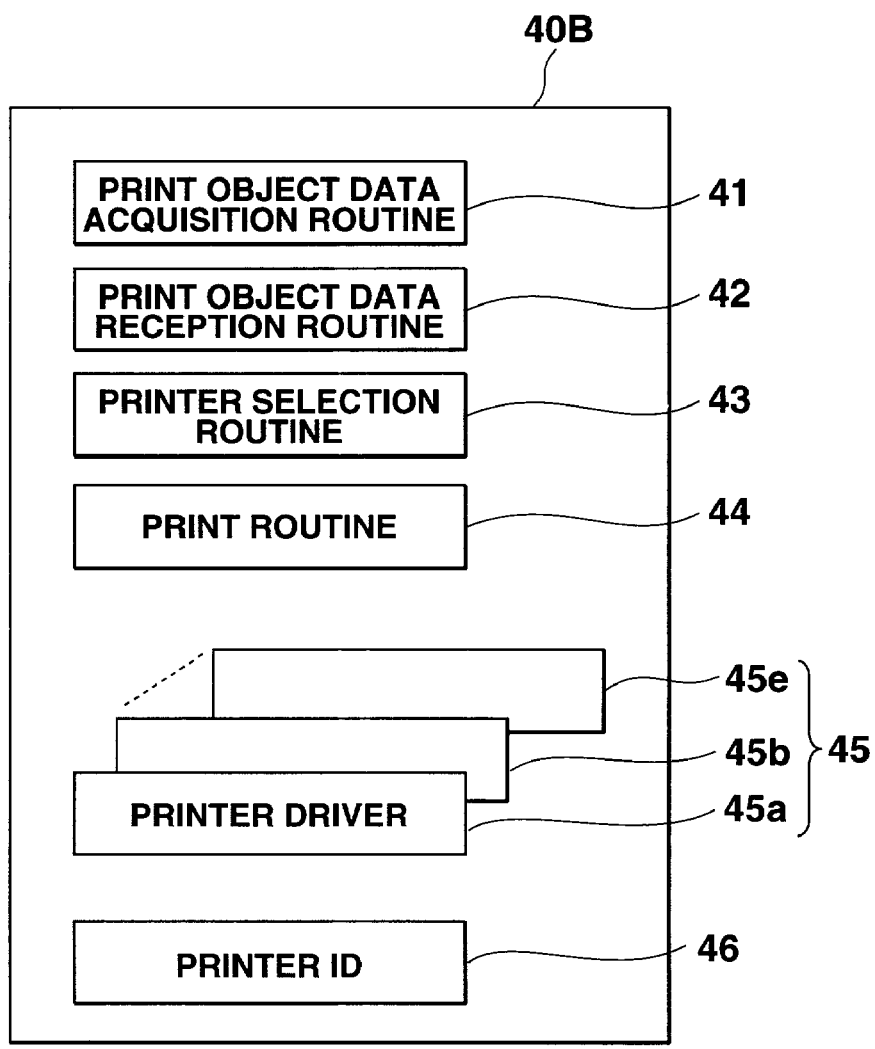
FIG. 11 is a view showing a plurality of programs executed by the print support service server and associated data.

In the print support service server 40B, as shown in FIG. 11, as programs for executing print support services, a print object data acquisition routine 41, print object data reception routine 42, printer selection routine 43, and print routine 44 are provided, and are stored in storage regions, respectively.

In the print support service server 40B, printer drivers 45 are further stored in a predetermined storage region. The printer drivers 45 include a plurality of printer drivers 45a, 45b, . . . 45e that correspond to different printers, respectively. Any of these printer drivers 45a, 45b, . . . 45e may correspond to a plurality of printers.

Each of the printer drivers 45a, 45b, . . . 45e stores and maintains specification data on the corresponding printer. For example, the printer driver corresponding to a label printer maintains specification data such as a plurality of label widths (for example, 48 mm and 24 mm) available for use in the label printer and print resolution (for example, 200 dpi) or the like. The printer driver corresponding to a laser printer includes specification data concerning form sizes (for example, B5, A4, B4) available for use in the laser printer and printer resolution (for example, 600 dpi) or the like. The print support service server 40B includes printer identification information 46. A description of the data will be given later.

The mobile telephone 60 comprises a function for directly transferring to the printer 30 print data received from the print support service server 40B, and then, executing printing of the received print data based on the print data. When the print data size is too large to receive by a single reception, transmission of the subsequent portion of print data by the print support service server 40B and reception and transfer of the subsequent portion by the mobile telephone 60 are repeated, and a hard copy can be finally obtained from the printer 30. The mobile telephone 60 is connected to the printer 30 via an interface (I/F) 71, and is connectable with another data processing unit such as a digital camera 31 or a personal computer (not shown).

FIG. 12 is a block diagram showing a configuration of the mobile telephone 60 and printer 30. The mobile telephone 60 comprises a transmitter/receiver 61, communication controller 62, sound processor 62, speaker 64, microphone 65, key input device 66, controller 67, ROM 68, RAM 69, display device 70, and I/F 71.

The transmitter/receiver 61 comprises a frequency conversion portion and a modem. The frequency conversion portion carries out radio wave frequency conversion and modulation/demodulation in order to make wireless communication with the base station 3 via an antenna ANT. The communication controller 62 carries out communication control based on a predetermined communication scheme (for example, TDMA (Time Division Multiple Access), CDMA (Code Division Multiple Access) or the like). The sound processor 62 encodes/decodes a voice signal.

The key input device 66 comprises numeric keys for inputting a telephone number, switches for carrying out on-hook/off-hook, a volume switch for changing a voice output and the like. The controller 67 controls the entire apparatus in accordance with a predetermined program. Specifically, the controller 67 exchanges digital data with the printer 30 via the I/F 71.

The ROM 68 stores a program executed by the controller 67 or a variety of parameters and the like. The RAM 69 stores a communication program for controlling signal transmission to/reception from the mobile communication network 2 caused by the mobile telephone 60 and a transfer control program for executing data transfer to the printer 30 or the like via the I/F 71.

The display device 70 comprises a liquid display, and displays an operation mode, a variety of data such as telephone number and conversion time, received image data, text data or the like under the control of the controller 67. The I/F 71 is a peripheral interface for connecting a device (printer 30 in this case) with a peripheral of the mobile telephone 60.

Unlike the first embodiment, the printer 30 is a general printing apparatus, and does not have a function (printer driver) for conversion into print data. The printer 30 comprises a mobile telephone peripheral interface 31 and a printer function portion 32. The mobile telephone peripheral interface 31 is connected to the I/F 71 that is a peripheral interface of the mobile telephone 60. The printer function portion 32 comprises a print mechanism for printing out on a form the print data transmitted from the mobile telephone 60.

Figure 13A:
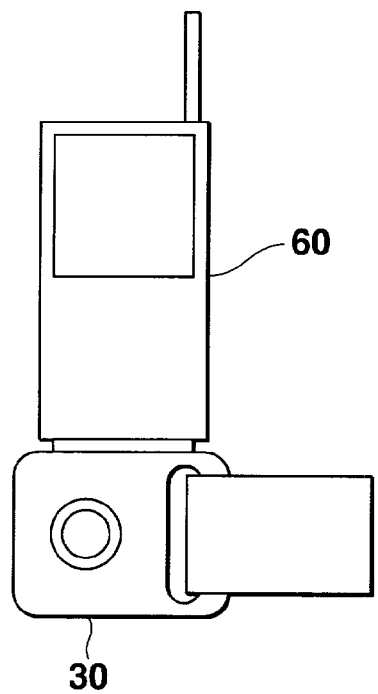
FIGS. 13A and 13B are schematic views exemplifying modes of connection between the portable communication terminal and the printer.
Figure 13B:
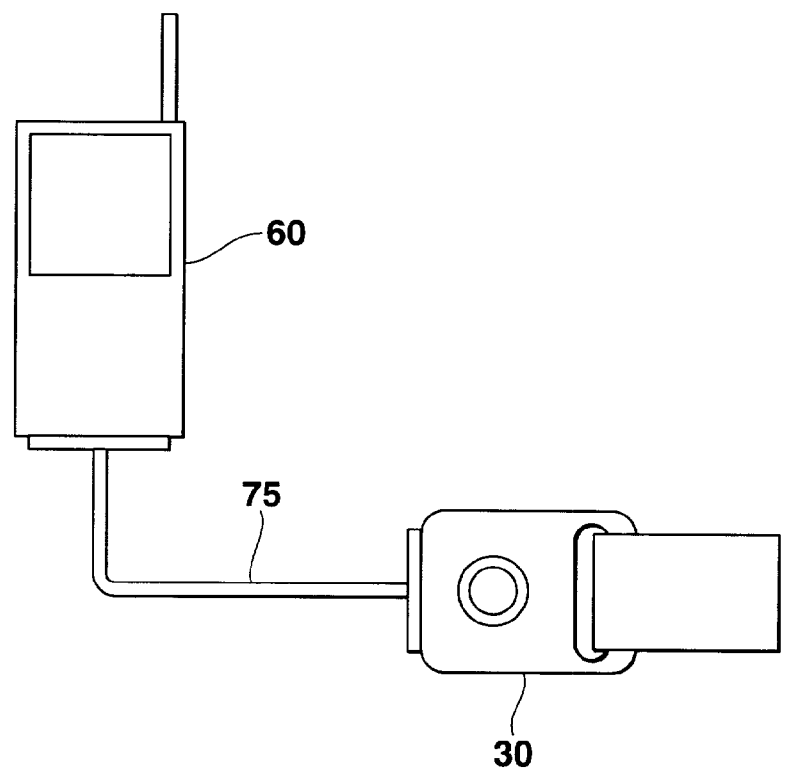

The printer 30 is directly connected to the peripheral interface connector of the mobile telephone 60 as shown in FIG. 13A or is connected to via a predetermined cable 75 as shown in FIG. 13B. According to its use, a monochrome printer, a color printer, or a label printer and the like is available as the printer 30. In addition, printable data may include privacy (prominent person) data, stock market data, gamble data, E-mail, and name card data or any other item of data that can be provided from the server side as well as image data.

Briefly, a print support service is executed as follows. The user operates his mobile telephone 60 to access the print support service server 40B via the mobile communication network 2. Data targeted for printing such as desired image data or document data is specified for this server 40B, and acquisition of the print object data is requested (#1). For example, when the user attempts to print an image of a specific character or a specific document, the user specifies the image or document data, and requests its acquisition.

The print support service server 40B acquires the print object data targeted for printing from the associate server 50. The user specifies identification information (#3) on a printer connected to the mobile telephone 60. Further, the user specifies a printing condition (#4). Specifically, the user specifies a form size or the like available for use in the printer 30 connected to the mobile telephone 60. Further, the user specifies a print format as required.

The server 40B modifies the acquired print object data in accordance with the user specified printing condition (#5). Print data for printing data targeted for printing after converted by the printer 30 (#6). Specifically, a control code defined by the printer 30 is assigned to the converted data targeted for printing. During print data generation, proper data conversion processing may be applied to the data targeted for printing after changed.

The server 40B transmits the generated print data to the printer 30 (#7). The mobile telephone 60 receives print data, and transmits the data to the printer 30 (#8). Then, the mobile telephone 60 executes printing of the received print data based on the print data. When the print data size is too large to receive by the single receiving, transmission of the subsequent portion of print data by the server 40B and reception and transfer of the subsequent portion by the mobile telephone 60 are repeated, and a hard copy is finally obtained from the printer 30.

In this way, the processing required for printing is executed by the print support service server 40B. Thus, even if a printer driver is not mounted on the mobile telephone 60, printing can be executed. In addition, the mobile telephone 60 itself may relay print data from the server 40B to the printer 30, and there is no need to execute special, burdensome processing. Further, even if the printer 30 connected to the mobile telephone 60 is changed in accordance with user movement, print data suitable to that printer can be supplied by the print support service server 40B. Thus, any printer can carry out printing.

In the present print support system, as described above, apart from data stored in the associate server 50 on Internet 4, image data acquired by the digital camera 31 and captured by the mobile telephone 60 or document data inputted by the user operating the mobile telephone 60 or a data processing unit connected thereto can be printed. In this case, the print support service server 40B acquires data targeted for printing from the mobile telephone 60. The print support service server 40B applies the same processing as that described previously to the acquired data, thereby generating print data, and then, transmitting the generated data to the mobile telephone 60.

Figure 10:
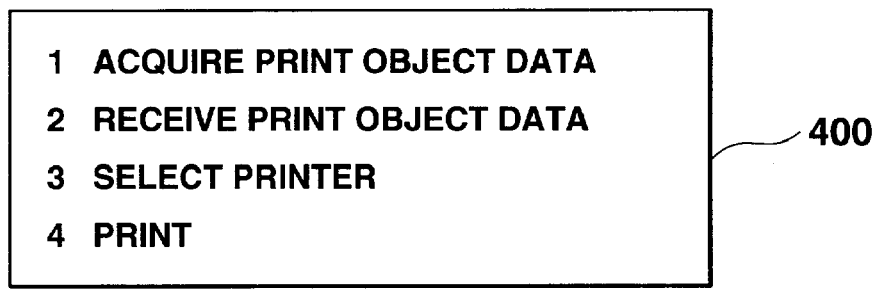
FIG. 10 shows an example of a homepage of the print support service server.

Hereinafter, a description will be given with respect to the details on the print support service system and print support method according to the second embodiment. FIG. 10 shows a menu associated with the second embodiment, the menu being included in a homepage 400 of the print support service server 40B. When the print support service server 40B is accessed by the mobile telephone 60, this menu is displayed. When a user makes a request for acquiring desired data targeted for printing service from any of the associate servers 50, an item "1" is selected. When the user makes a request for receiving data targeted for printing by the mobile telephone 60, an item "2" is selected. When a printer for printing the acquired data or received data is selected, an item "3" is selected. When printing of the acquired data or received data is executed, an item "4" is selected. When any one of the items "1" to "4" is selected from the homepage 400, the print object data acquisition routine 41, print object data reception routine 42, printer selection routine 43, and print routine 44 are executed, respectively.

First, a user attempting to receive print support service operates the mobile telephone 60 to access the print support service server 40B. When the homepage 400 (FIG. 10) is displayed, if a request is made to acquire data targeted for printing from the associate server 50, the user selects a print object data reception item "1". When the item "1" is selected, the print object data acquisition routine 41 is initiated.

Figure 14:
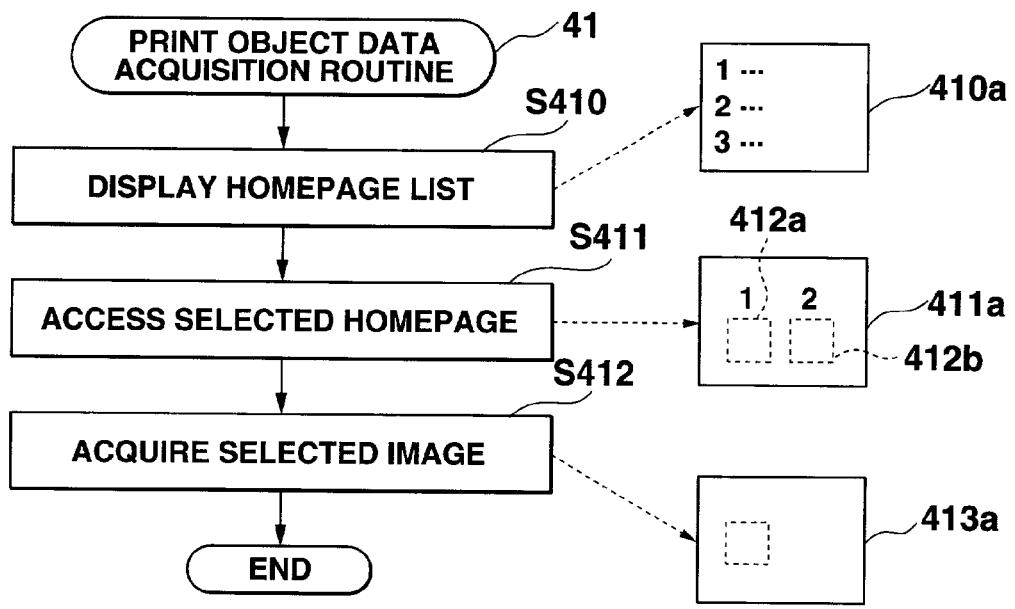
FIG. 14 is a schematic flow chart of a print object data acquisition routine.

As shown in FIG. 14, the print object data acquisition routine 41 causes the mobile telephone 60 to display a plurality of homepage names having registered therein data targeted for printing, the data being provided by a plurality of associate servers (step S410). Reference 410a exemplifies a screen of the display device 70 of the mobile telephone 60, where a number for identifying print object data is assigned before the name of each home page. The user can select a desired homepage by specifying the number assigned to the homepage name, for example. Alternatively, a method for selecting a line on which such a homepage name is displayed may be used. The URL of the homepage of an access destination is associated with each homepage name or the number assigned thereto.

The print support service server 40B accesses the homepage having the homepage name stored in the associate server 50 by using the URL associated with the selected homepage name, and then, causes the mobile telephone 60 to display the homepage (step S411). The homepage includes a menu of available data. Here, it is assumed that the user requests acquisition of image data. Reference numeral 411a exemplifies a screen of the mobile telephone 60 when the homepage of the associate server 50 is displayed, where a plurality of image data 412a and 412a are displayed together with the corresponding image numbers.

The user selects any image data number, for example, whereby the user can select desired print object data. The print support service server 40B acquires the selected image data from the associate server 50, and causes the mobile telephone 60 to display the acquired image data (step S412). Reference numeral 413a exemplifies a screen of the mobile telephone 60 when the image data is displayed. The user selects a proper method, for example, select an OK button (not shown), whereby it is verified that the displayed data is desired print object data. Then, execution of the print object data acquisition routine 41 terminates, and the homepage 400 (FIG. 10) is displayed on the mobile telephone 60.

Thereafter, when the user select a print item "3", a printer selection routine 43 is initiated. In the printer selection routine 43, printer identification information 46 shown in FIG. 11 is used. The printer identification information 46 includes data concerning a plurality of printers that the server 40B can use as a target of printing service.

Figure 15:
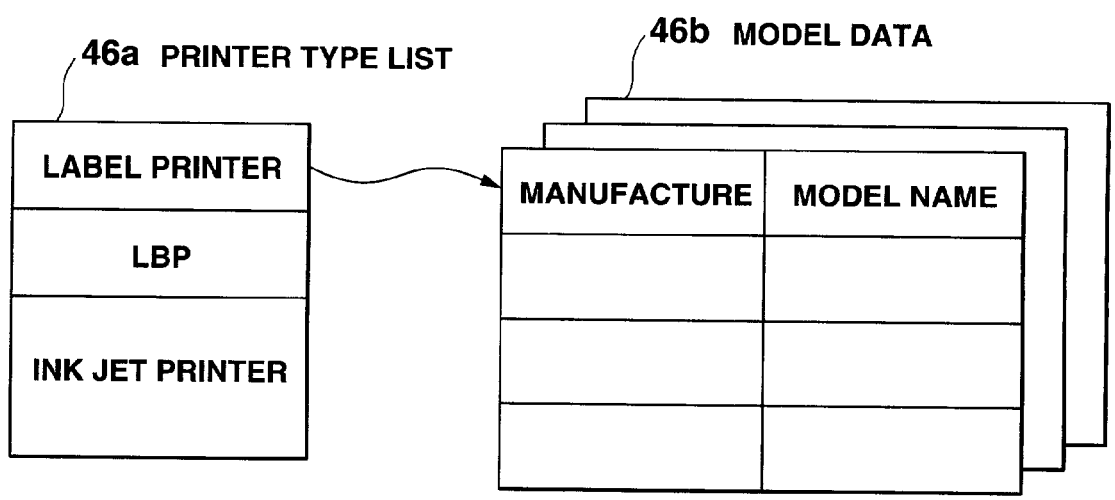
FIG. 15 is a view showing the contents of printer identification information.

Specifically, the printer identification information 46 includes type data 46a and model data 46b or the like, as shown in FIG. 15, for example. As the type data 46a, there are recorded types of label printer, laser beam printer (LBP), and ink jet printer or the like, for example. The model data 46b is provided for each printer type, and there are recorded identification information of models of a plurality of printers, each of which is available for use in the print support service server 40B, of a plurality of printers belonging to such type, for example, a pair of manufacturer name or model name.

Figure 16:
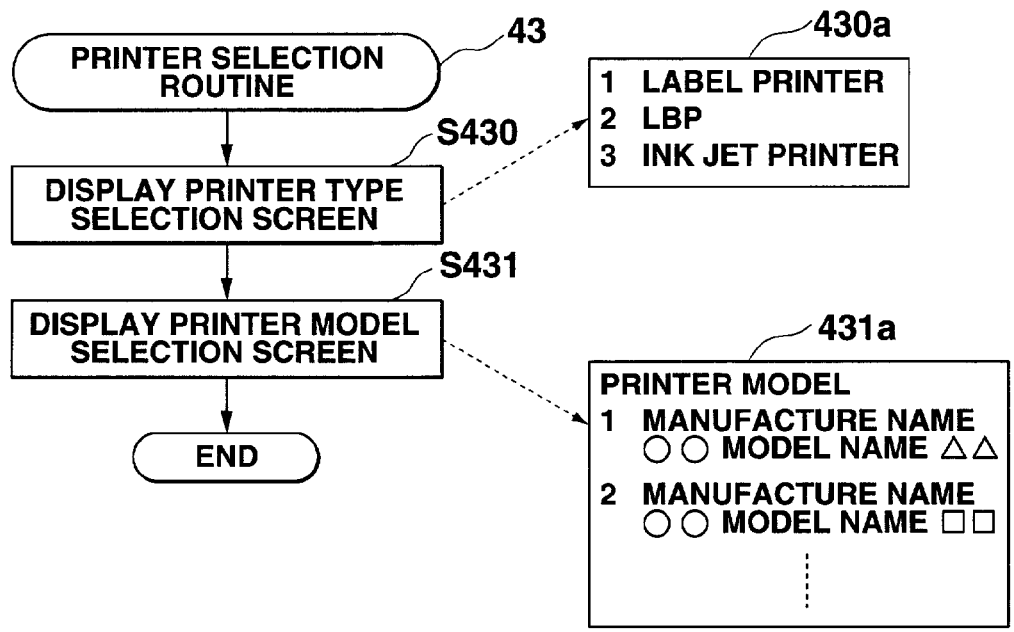
FIG. 16 is a schematic flow chart of a printer selection routine.

The printer selection routine 43 is executed in accordance with the procedures shown in FIG. 16, for example. First, a printer selection screen is displayed by the mobile telephone 60 (step S430). Reference numeral 430a exemplifies the selection screen of the mobile telephone 60, where types of a plurality of printers and the identification number for each type that are available for use in the print support service server 40B are displayed.

The user can specify type of printer 30 (FIG. 9) connected to the mobile telephone 60 in use by specifying a proper method, for example, the identification number assigned to such type. Here, it is assumed that the printer 30 in use is a label printer. The label printer is light-weighted, is suitable to be portable, and is suitable to be used together with the mobile telephone 60. In recent years, a label printer capable of printing a color image is available.

When a printer type is specified, a model selection screen is displayed on the mobile telephone 60 (step S431). On this screen, model data on a plurality of printers belonging to the specified printer type are displayed on the model data 46b (FIG. 15). When the user specifies a label printer at the step S430, for example, parts of manufacturer names and model names of a plurality of label printers and the model number for each pair are displayed as shown in the screen 431a.

The user can specify the model number of the printer 30 (FIG. 9) in use by specifying a proper method, for example, model number assigned to such model. In this way, data for identifying model of the printer 30 is notified to the print support server 40B. The identification information is stored in the print support service server 40B, and the printer selection routine 43 terminates. Thereafter, the homepage 400 (FIG. 10) is displayed on the mobile telephone 60.

Figure 17:
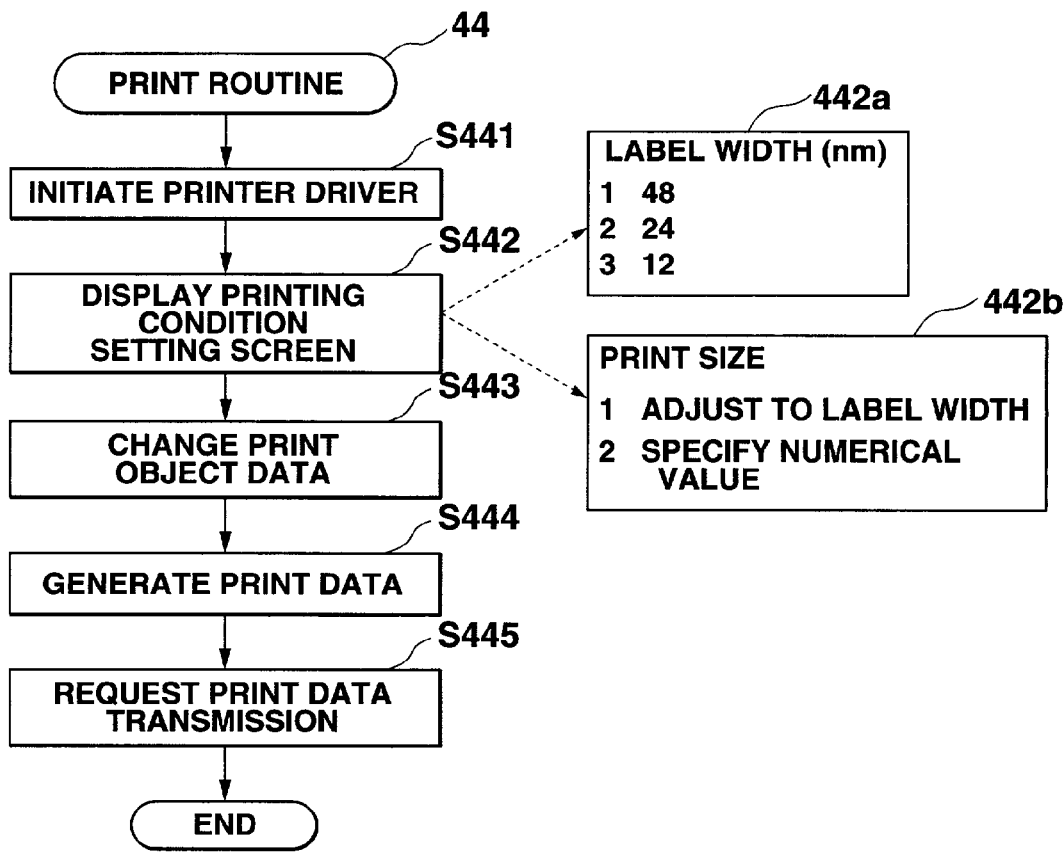
FIG. 17 is a schematic flow chart of a print routine.

When the user selects the print item "4", the print routine 44 is executed, and printing is actually executed. The print routine 44 is executed in accordance with the procedures shown in FIG. 17, for example. First, of the printer drivers 45a to 45e (FIG. 11) stored in the print support service server 40B, the printer driver that corresponds to a printer specified by the printer selection routine 43 is initiated (step S441).

In a conventional personal computer, a printer driver defined corresponding to a printer connected to the personal computer is initiated prior to executing printing of print object data. The printer driver performs processing required for printing with reference to the print object data, generates print data to be supplied to a printer, and supplies the print data to the printer.

Although the printer driver used in the present embodiment generates print data in the same manner as the conventional printer driver, the print data is transmitted to the mobile telephone 60 instead of being directly supplied to a printer (not shown) provided as accessories to the server 40B. That is, the printer driver is constructed so as to transmit to the mobile telephone 60 the print data via a communication program provided at the server 40B for executing communication with the mobile telephone 60 in order to execute printing by the printer 30 provided as accessories.

The following processing of the print routine 44 is executed by the initiated printer driver. Like the conventional printer driver, a printer driver for use in the present embodiment as well causes the mobile telephone 60 to display a screen for setting a printing condition when the driver is initiated, and prompts the user to input the printing condition (step S442). The printer driver is configured so as to cause the mobile telephone 60 to display a small sized printing condition setting screen that can be displayed at the display portion of the mobile telephone 60. The printing conditions to be specified differ depending on a kind of printer and whether image data or document data is to be printed. The printing condition setting screen display can be occasionally omitted.

Reference numeral 442a exemplifies a printing condition setting screen for a label printer. Here, a condition concerning a medium (label) for use in printing is specified. In general, labels with their different widths are available for use in such label printer. The screen 442a displays a pair of plurality of label widths for use in the user specified label printer and identification number. The user specifies the width of a desired label by specifying the identification number, for example. It is assumed that 8 mm are specified. If there is another item to be specified as a printing condition, the other item as well is specified similarly.

For example, reference numeral 442b exemplifies a screen for specifying another printing condition to be specified if image data is to be the print object data. Here, a condition concerning print format such as the shape or size of an image printed for a label is specified. In the figure, the size of the printed image is specified. For example, it is specified whether or not the print size is automatically adjusted to a label width specified on the printing condition setting screen 442a or the user numerically specifies the print size. If the latter is specified, a screen for inputting a numeric value (not shown) is displayed, where the user numerically inputs the print size.

When settings of the printing condition have been done, the printer driver modifies print object data in order to print the print object data in accordance with the specified printing condition in the specified printer (step S443). The contents of data conversion to be executed vary depending on whether image data or document data is to be printed. Data conversion may be occasionally unnecessary.

In the case of image data, the print object data is converted to image data printable by the printer 30 in use. For example, the size of an image to be printed varies depending on the number of pixels in original image targeted for printing and a printer resolution. FIG. 18 shows a relationship between the number of pixels in print target image data and the size of the image obtained by printing, in the case of 200 dpi or 400 dpi in printer resolution. An image printed by the printer 30 provided as accessories to the mobile telephone 60 is required to be printed so as to have a size specified in accordance with a printing condition on a label with its width specified in accordance with the printing condition.

The label width of the label printer is generally small, thus disabling printing within the label width unless the number of pixels in print target image data is reduced. For example, when the label printer resolution is 200 dpi, if the number of pixels in print object data is 640×480 dots, the width x height of the image obtained by printing is 81.3 mm×61.0 mm, as shown in FIG. 18.

Therefore, even if the width of the label for use in the label printer is 48 mm, it is required to reduce the number of pixels in print target image data. Further, when the user specifies a print size on the screen 442a (FIG. 17), it is required to reduce the number of pixels in print target image data so that the size of the resultant print data is smaller than the label width.

The image data targeted for printing is stored in accordance with a predetermined image format. Therefore, prior to making the data conversion, the format is converted into a bit map (BMP) format as required, and the data conversion is made for image data after format conversion.

When data conversion is made for the print target image data as described above, there is obtained image data in the bit map format that satisfies the user specified printing condition. The printer driver generates print data for printing the print object data after converted by the printer 30 (step S444). Specifically, a control code required for printing the print object data after converted by the printer 30 is determined, and the determined code is added to the converted print object data. The control code is a code for controlling a printing operation by the printer 30, and is generally a code specified to the printer 30.

The control code may be referred to as a print command or any other term. For example, if the print object data is image data as described above, a control code or the like for specifying a printing start position of an image to be printed is used as the printing condition.

During print data generation, image processing defined by the printer driver may be applied to the print object data after converted. For example, image processing suitable to an available printer or processing for modifying print object data according to the number of colors that are printable by the available printer can be carried out.

Thereafter, the printer driver requests a communication program to transmit the generated print data (step S445). The communication program transmits print data to the mobile telephone 60. The print data is segmented into a plurality of partial data, and the plurality of partial data are sequentially transmitted to the mobile telephone 60. The transmitted partial print data is received under the control of the communication program in the mobile telephone 60, and the received data are stored in a memory therein. The mobile telephone 60 transmits the received partial print data to the printer 30 immediately, serves the data for printing by the printer 30.

As described later, when print data whose amount can be received by the printer 30 one time is transmitted to the printer 30, a signal for disabling transmission of the subsequent portion of the print data is supplied to the mobile telephone 60 from the printer 30. This signal is transmitted to a communication program of the server 40B via the communication program of the mobile telephone 60, and further, is notified to the printer driver. This printer driver temporarily cancels requesting the communication program to transmit the subsequent print data portion in response to this signal.

Thereafter, at a time when printing at the printer 30 terminates, or at a time when a data transmission request is notified from the printer 30 similarly, the printer driver requests the communication program to transmit the subsequent print data portion. In this way, the printer driver exchanges data and signals with the printer 30 via the server 40B and the mobile telephone 60. Then, the print routine 44 terminates. Upon transmission of print data, it is desirable that the print data be transmitted after compressed by a proper method.

Reception of print data transmitted from the print support service server 40B and printing at the printer 30 based on the print data are executed as follows. The controller 67 receives the print data from the print support service server 40B under the control of the communication program, and temporarily stores the received print data in a buffer region of the RAM 69. At the same time, the print data is supplied immediately to the printer 30 via the I/F 71 under the control of the transfer control program.

Data transfer between the controller 67 and the printer 30, for example, is done as follows. In general, a printer buffer and a control code decoder circuit (the printer function portion 32) are incorporated in the printer 30. The control code decoder circuit decodes control data included in the print data, and stores the print object data included in the print data (bit map format data in this case) at a proper position in the printer buffer.

If the size of data to be printed is larger than one page of the printer buffer, when data to be printed on one page is stored in the printer buffer, a signal for requesting cancellation of transfer of print data is notified from the printer 30 to the controller 67. The controller 67 cancels transfer of print data in response to this cancellation request under the control of the transfer control program. At the same time, this cancellation request is further transferred to the communication program in the mobile telephone 60, and cancellation of transmission of the subsequent print data is requested.

At the time when the print object data stored in the printer buffer is printed, transfer of the subsequent print data is requested from the printer 30 to the controller 67, and this request is notified to the printer driver in the print support service server 40B. As a result, transfer of the subsequent print data from the print support service server 40B to the mobile telephone 60 is restarted. Then, similar operation is repeated. In thus way, the image data stored in the associate server 50 is printed by the printer 30 connected to the mobile telephone 60.

If the print object data requested by the user is document data, it is possible to specify a printing condition that is different from a case of image data as a printing condition specified during execution of the print routine 44 (FIG. 15). For example, if the printer 30 is a label printer, a format specification screen is further displayed after a label width specification screen 442a and a print size specification screen 442b, making it possible to cause the user to specify a format such as number of lines printed on one page.

FIG. 19A shows an example of such a format specification screen 442c. Here, the number of characters in a horizontal line, the number of lines, type of character font, and size of character font or the like are specified by the user in accordance with numeric input or employing a selection menu. FIG. 19B shows an example of the print result when a small size of character font is specified on a label. FIG. 19C shows an example of the print result when a large size of character font is specified on a label.

If the print object data is document data, and a printing condition concerning format is specified as a printing condition, at the data conversion step S443 such a printing condition is changed so as to be coincident with a format in which disposition of a character string that configures print object data is specified. If a character font is specified, the font is changed as well.

Thereafter, at the print data generation step S444, a control code for printing print object data in accordance with a printing condition is added to a character code string that configures document data, and print data is generated. For example, a plurality of control codes specifying a printing start position, a character font, a character size, a character color or the like are inserted by each character code or by a plurality of character codes having the same printing style (format). When the print data is sent, the printer generates a bit map representative of individual character patterns in accordance with the control codes specified for the character code of the respective characters, and the generated bit map is used for printing. This bit map may be generated at the print data generation step S444.

FIGS. 20A and 20B shows an example of a printing condition that is specifiable when the printer 30 is a laser printer. In FIG. 20A, the printing form size is specified. In FIG. 20B, a page format is specified.

In place of the print object data stored in the associate server 50, the following method may be employed for the user to print document data inputted to the memory 23 by using the key input portion 22 of the portable communication terminal 1 or document data inputted to a data processing unit (not shown), or alternatively, image data obtained by image picking-up using the digital camera 31 connected to the mobile telephone 60. That is, when the homepage 400 (FIG. 10) of the print support service server 40B is displayed, the user selects print object data reception item "2". As a result, the print object data reception routine 42 (FIG. 3) is initiated.

By execution of this routine 42, the document data inputted by using the key input portion 22 or document data inputted to a data processing unit (not shown), or alternatively, image data picked-up by the digital camera 31 is transmitted as print object data from the memory 23, digital camera 31, or alternatively, the data processing unit (not shown) to the print support service server 40B via the mobile telephone 60. Thereafter, the above described processing is applied to the print object data, print data is generated, the generated print data is transmitted to the printer 30 via the mobile telephone 60, and the transmitted data is printed.

In this manner, the user specified print object data can be easily printed by the printer 30 connected to the mobile telephone 60. Moreover, there is no need for the mobile telephone 60 to carry out data conversion of print object data according to a printing condition, and further, determination of control codes required for generating print data or the like. Therefore, a processing burden on the mobile telephone 60 is not so large.

THIRD EMBODIMENT

In the second embodiment, the print data is generated in the print support service server 40B by the printer driver, and the print data is partially transmitted to the printer 30 via the mobile telephone 60, thereby achieving printing. In this case, communication between the print support service server 40B and the mobile telephone 60 continues until all the print data has been transmitted to the printer 30. When the size of the print object data is large, a communication time is extended, and there is a possibility that the access charge of the mobile telephone 60 increases in amount.

The third embodiment makes it possible to reduce this communication time. The capacity of RAM 69 in the mobile telephone 60 shown in FIG. 12 is increased, thereby making it possible to store the print object data acquired by the print support service server 40B and converted according to a printing condition and to store required printer drivers. Unlike the second embodiment, print data is generated in the mobile telephone 60, and printing is executed offline.

That is, when the print object data reception item "1" is selected from the homepage 400 (FIG. 10) of the print support service server 40B, as in the first embodiment, the print routine 44 is executed after the print object data acquisition routine 41 and printer selection routine 43.

In the print routine 44 (FIG. 17), the data conversion step S443 is executed, and print object data is changed according to the user specified printing condition. The print data generation step S444 is not executed. The print object data after converted, the data being obtained at the data conversion step S443, and the printer driver that corresponds to the printer specified by the printer selection routine 43, are transmitted from the print support service server 40B to the mobile telephone 60. The mobile telephone 60 receives the print object data after converted and the printer driver, and stores them in a buffer region of the RAM 69. Thereafter, communication between the print support service server 40B and the mobile telephone 60 is interrupted.

The user initiates the printer driver transmitted to the mobile telephone 60 by way of proper key operation. When the printer driver is initiated, it executes the print data generation step S444 for the received print object data after converted. In this way, print data is generated, and the generated data is stored in a proper buffer region in the RAM 69. Thereafter, the printer driver sequentially transmits the print data to the printer 30 via the transfer control program, and causes the printer to execute printing. The printer driver controls a timing of transferring the subsequent print data in response to a signal from the printer 30. In this way, generation and printing of print data is carried out offline.

According to the third embodiment, as in the second embodiment, data conversion of print object data is executed by the print support service server 40B according to a printing condition, and thus, there is no need to carry out such data conversion by the mobile telephone 60. While the same printer is connected to the same portable communication terminal, the once received printer driver can be continuously used for printing of another print object data. Therefore, it is desirable to provide a nonvolatile memory region for storing the received printer driver in the mobile telephone 60.

FOURTH EMBODIMENT

Figure 21:
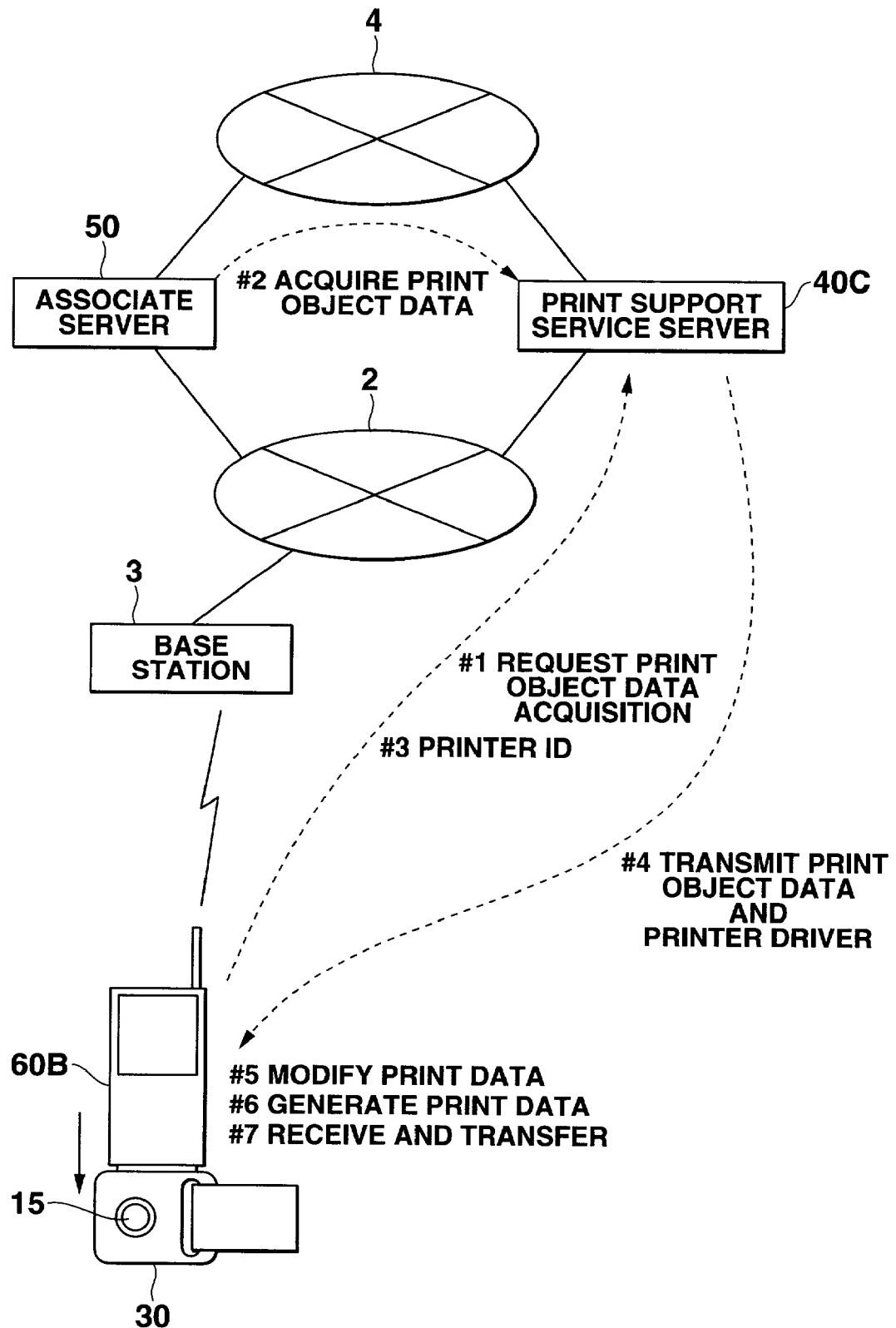
FIG. 21 is a schematic block diagram showing a print support service system according to a fourth embodiment of the present invention.

FIG. 21 is a schematic block diagram showing a print support system according to the fourth embodiment of the present invention. A print support service server 40C transmits a printer detection program for identifying the printer 30 connected to the mobile telephone 60 when a print request is made from the mobile telephone 60 in access. In addition, the print support service server 40C stores the printer driver that corresponds to each of the printers in accordance with their different specifications. Then, in accordance with a printer ID indicative of printer type from the mobile telephone 60, the printer driver corresponding to the printer and a print service program for processing (reducing, enlarging, clipping or the like) of the downloaded image data are transmitted to the portable communication terminal 1.

A mobile telephone 60B has a function for accessing to the print support service server 40C, initiating the downloaded printer detection program from the print support service server 40C, acquiring the printer ID of the printer 30 connected to the mobile telephone 60, and transmitting the acquired ID to the print support service server 40C. In addition, the mobile telephone 60B has a function for initiating the print service program downloaded from the print support service server 40C, and carrying out browsing, processing, and selection or the like for the image data downloaded from the print support service server 40C similarly, or alternatively, delivering the image data as print data to the connected printer 30, by the printer driver downloaded from the print support service server 40C.

The configuration of mobile telephone 60B is similar to that shown in FIG. 12, but is different therefrom in the points below. In the fourth embodiment, the controller 67 initiates the printer detection program downloaded from the print support service server 40C, and acquires the printer ID of the printer connected to the mobile telephone 60B so as to transmit the printer ID to the print support service server 40C. In addition, the controller 67 initiates a print service program downloaded from the print support service server 40C, and carries out browsing, processing, and selection or the like for image data, whereas it converts the image data into print data by the printer driver downloaded from the print support service server 40C so as to deliver the converted data to the printer 30.

In addition, in the fourth embodiment, the RAM 69 is employed as a working area for storing data generated due to the control of the controller 67, image data downloaded from the print support service server 40C, text data, and a variety of programs (including a printer detection program, a print service program, and a printer driver).

Figure 22:
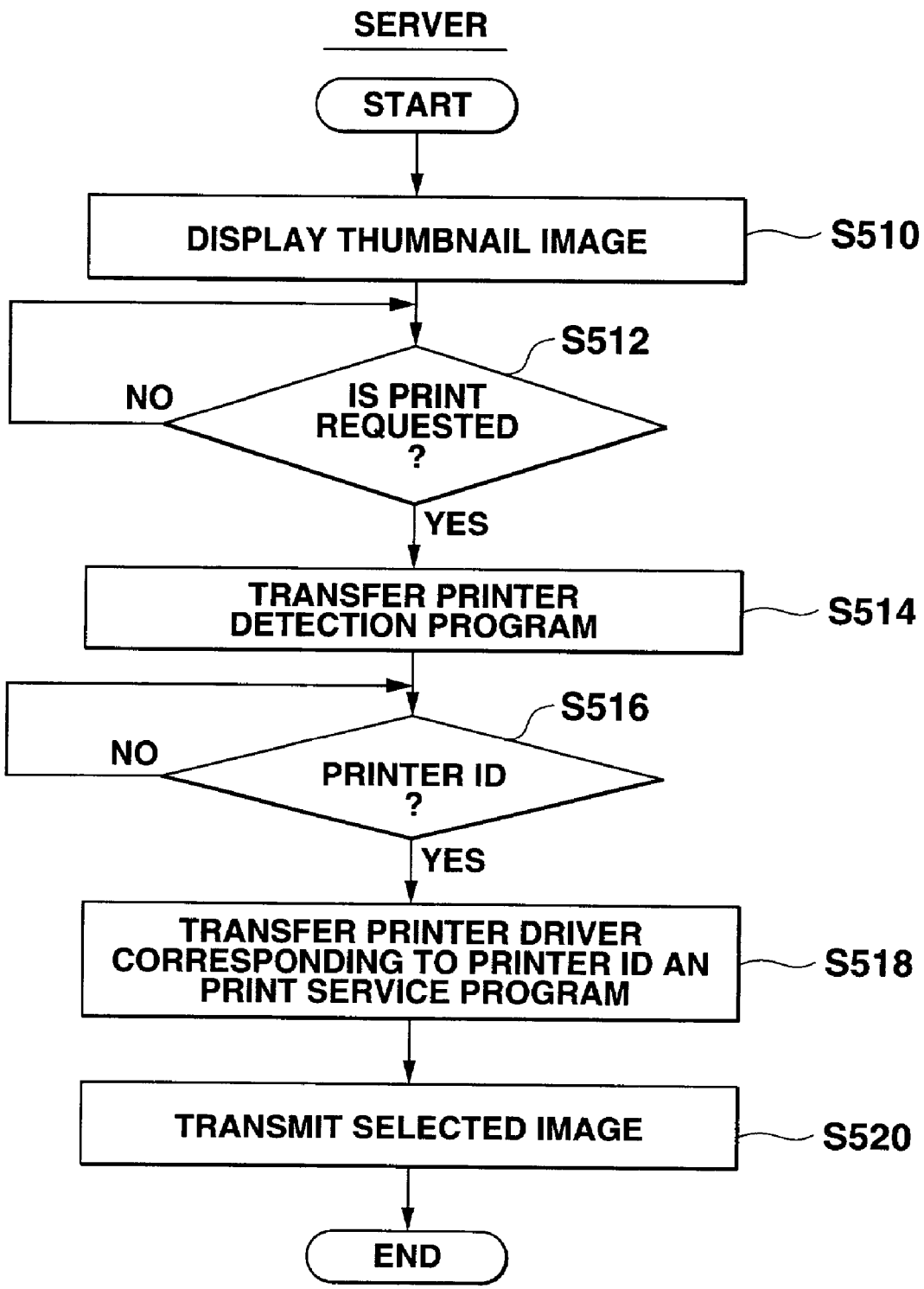
FIG. 22 is a flow chart illustrating an operation of the print support service server.
Figure 23:
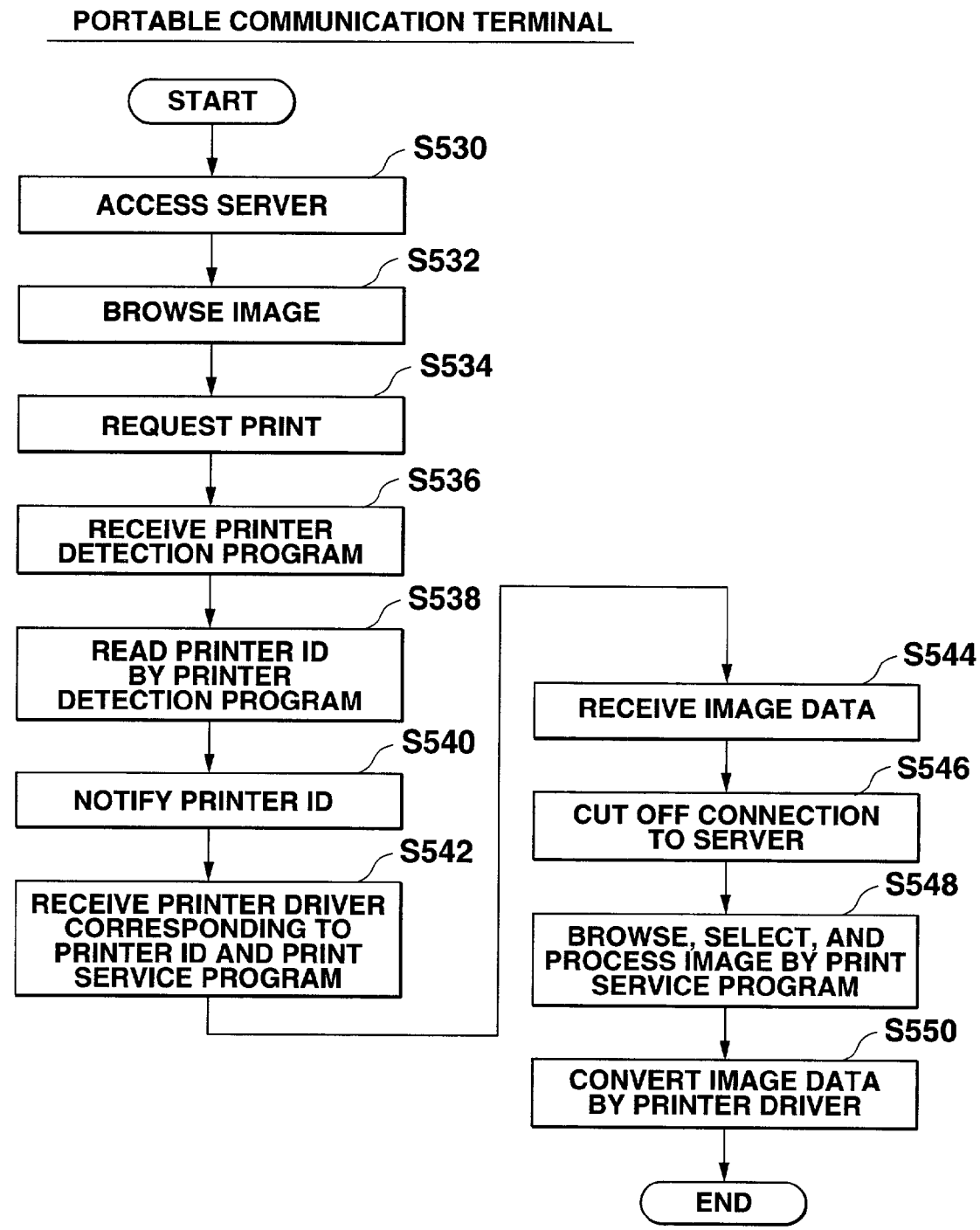
FIG. 23 is a flow chart illustrating an operation of the portable communication terminal.
Figure 24:
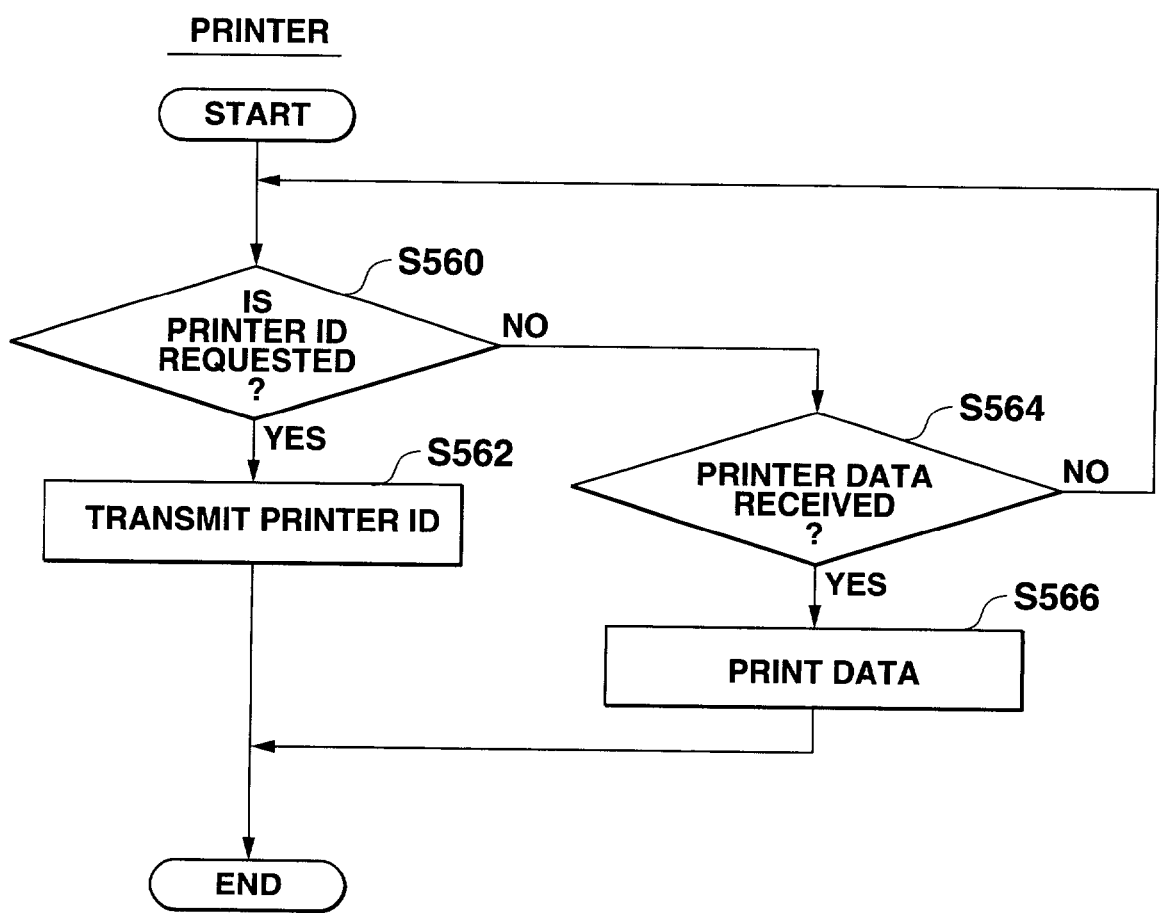
FIG. 24 is a flow chart illustrating a printer operation.

Now, an operation of the fourth embodiment will be described here. FIG. 22 is a flow chart illustrating an operation of the print support service server 40C. FIG. 23 is a flow chart illustrating an operation of the mobile telephone 60B. FIG. 24 is a flow chart illustrating an operation of the printer 30.

First, an operation of the print support service server 40C will be described with reference to FIG. 22. In the print support service server 40C, when it is accessed by the mobile telephone 60B, image data is displayed as a thumb nail so as to enable browsing at the mobile telephone 60B (step S510). Then, it is determined whether or not a print instruction is supplied from the mobile telephone 60B (step S512). If a print request is made, a printer detection program is transmitted to the mobile telephone 60B (step S514). Then, in the print support service server 40C, it is determined whether or not the printer ID indicative of a printer type is transmitted from the mobile telephone 60B (step S516). If a printer ID is transmitted, the printer driver corresponding to the printer ID and a print service program are transmitted to the mobile telephone 60B (step S518). Then, image data selected by the mobile telephone 60B is transmitted (step S520).

Now, an operation of the mobile telephone 60B will be described with reference to FIG. 23. In the mobile telephone 60B, first, connection with the print support service server 40C is established based on a telephone number (and/or URL) for connecting with the print support service server 40C (step S530). Next, the image data provided by the print support service server 40C is browsed, and desired print image is selected (step S532). A print request is transmitted to the print support service server 40C (step S534). Then, the printer detection program from the print support service server 40C is received (step S536), the printer detection program is initiated, and a printer ID is read from the connected printer 30 (step S538). Then, the printer ID is notified to the print support service server 40C (step S540).

Next, in the mobile telephone 60B, the corresponding printer driver and print service program (step S542) and the selected image data (step S544) are received from the print support service server 40C. Thereafter, circuit connection with the print support service server 40C is cut off (step S546). Then, the downloaded image data is processed (re-duced, enlarged, or clipped) in accordance with the print service program (step S548). The processed image data is converted into print data by the printer driver, and the converted print data is transmitted to the printer 30.

Now, an operation of the printer 30 will be described with reference to FIG. 24. First, it is determined whether or not a printer ID is requested from the mobile telephone 60B (step S560). If no printer ID is requested, it is determined whether or not the print data is received (step S564). If the printer ID is requested, the printer ID stored in a main body of the printer 30 is transmitted to the mobile telephone 60B (step S562). On the other hand, if print data is received from the mobile telephone 60B, the received print data is printed out on a form by a printer function 32 (step S566).

Figure 25:
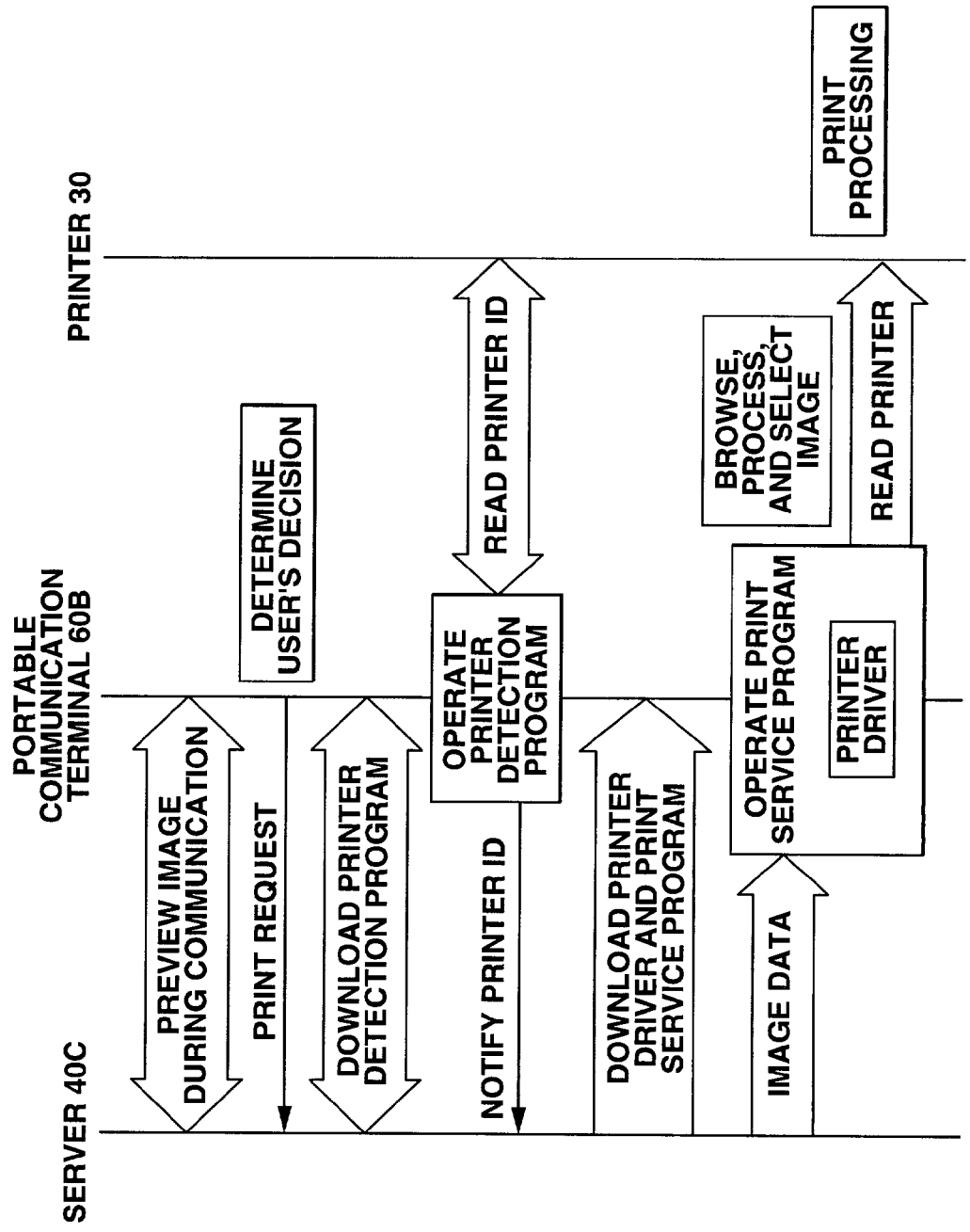
FIG. 25 is a sequence chart illustrating an entire operation of the third embodiment.

FIG. 25 is a sequence chart illustrating an entire operation of the above described embodiment. The user first connects the printer 30 with the mobile telephone 60B. Thereafter, the user connects the mobile telephone 60B with the print support service server 40C by using the telephone number (and/or URL) for connecting with the print support service server 40C, and browses image data provided by the print support service server 40C. If a desired print data exists in the image data being browsed, the user transmits a print request to the print support service server 40C.

The print support service server 40C transmits a printer detection program to the mobile telephone 60B according to a print request from the mobile telephone 60B. The mobile telephone 60B initiates the printer detection program, acquires a printer ID indicative of a printer type from the printer 30, and notifies the acquired ID to the print support service server 40C.

The print support service server 40C transmits to the mobile telephone 60B the printer driver that corresponds to the printer type and a print service program in accordance with the printer ID. In this way, every time a print request is made from the mobile telephone 60B, an optimal printer driver is downloaded to the printer connected to the mobile telephone 60B, thereby making it possible to support a variety of printers having their different specifications.

The mobile telephone 60B initiates the print service program, and the user browses, processes, or selects image data on the server by using the print service program. The print support service server 40C transmits the selected image data to the mobile telephone 60B. The mobile telephone 60B receives the image data, converts the received image data into print data by the above described printer driver, and transmits the converted print data to the printer 30. The printer 30 prints out the print data from the mobile telephone 60B on a form by the printer function portion 32.

Although the fourth embodiment has described only the printer 30 as a peripheral device connected to the mobile telephone 60B, a reproduction apparatus for reproducing music data or a display unit for displaying image data or character data and the like with high resolution and on a large screen may be used as such peripheral device. For example, in the case of the reproduction apparatus, a pro-gram for converting a music data format into a format employed by the reproduction device is downloaded in advance, thereby making it possible for a reproduction support service server to support a variety of reproduction apparatuses having their different specifications. It is pos-sible to integrate the data format of music data provided by the reproduction support service server. In addition, in the case of the display unit, a program for converting an image data format into a format employed by the display unit is downloaded in advance, thereby making it possible for a display support service server to support a variety of repro-duction apparatuses having their different specifications. It is possible to integrate the data format of image data provided by the display support service server.

FIFTH EMBODIMENT

Figure 26:
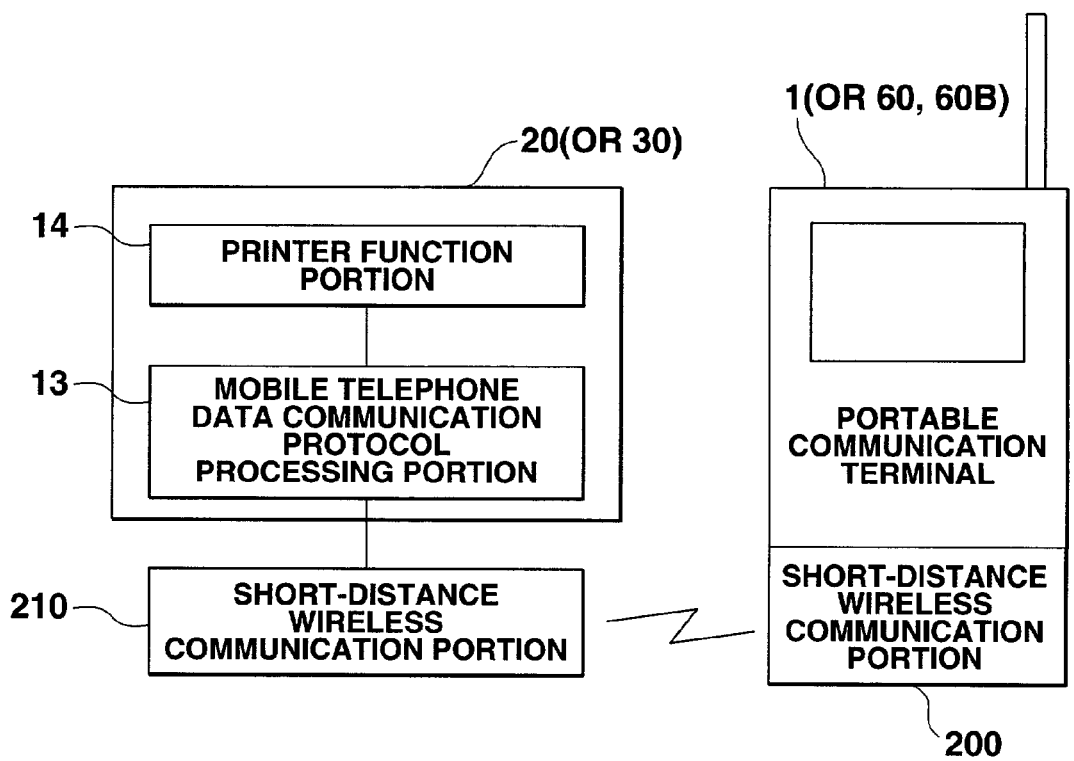
FIG. 26 is a block diagram showing a wireless connection between the portable communication terminal and the printer according to the fifth embodiment of the present invention.

Now, the fifth embodiment of the present invention will be described here. The fifth embodiment is applicable to the first to fourth embodiments, and is characterized in that data communication is made wirelessly between a portable com-munication terminal and a printer. FIG. 26 is a block diagram showing wireless communication between a por-table communication terminal and a printer according to the fifth embodiment. The portable communication terminal 1 (or 60, 60B) comprises a short-distance wireless communi-cation portion 200 connected via a peripheral interface or the like. On the other hand, the printer 20 (or 30) comprises a short-distance wireless communication portion 210 instead of the peripheral interface.

Figure 27:
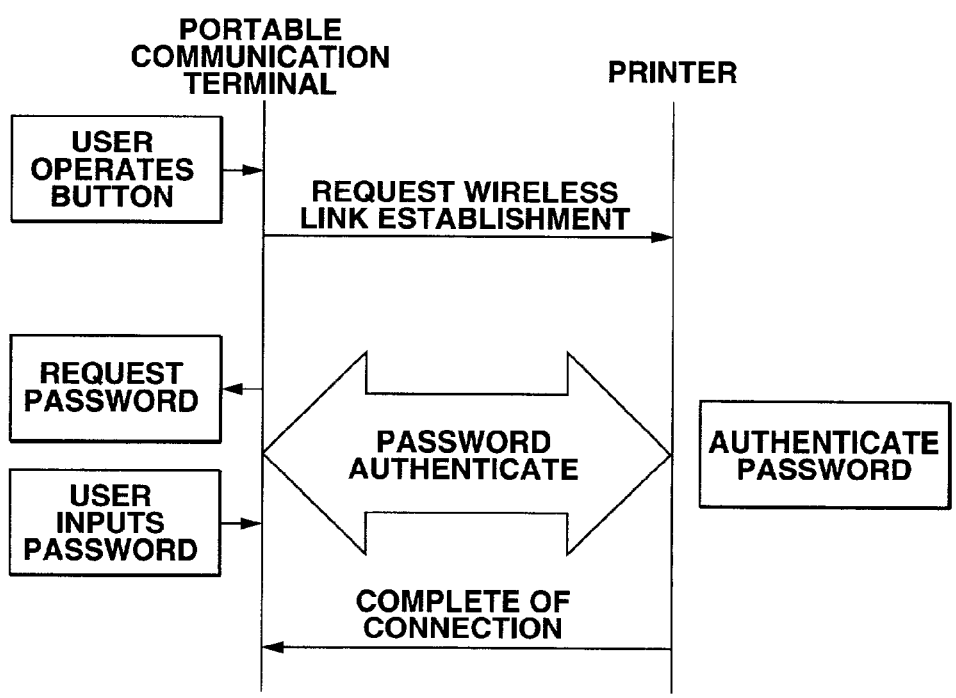
FIG. 27 is a sequence chart showing an example of procedures for establishing a wireless link.

FIG. 27 is a sequence chart showing an example of procedures for establishing a wireless link. When the user depresses a predetermined button at the portable communication terminal 1 (or 60, 60B), a request for establishing a wireless link is transmitted from the short-distance wireless communication portion 200 at the portable communication terminal 1 (or 60, 60B) to the short-distance wireless communication portion 210 at the printer 20 (or 30). At the printer 20 (or 30), when a request for establishing a link is received, a password request is transmitted to the portable communication terminal 1 (or 60, 60B).

At the portable communication terminal 1 (or 60, 60B), the user inputs a password, and transmits the inputted password to the printer 20 (or 30). The printer collates the transmitted password with a password being stored, and carries out authentication connection.

If the password is coincident, the completion of connection is transmitted to the portable communication terminal 1 (or 60, 60B). In this manner, a wireless link between the portable communication terminal 1 (or 60, 60B) and the printer 20 (or 30) is established.

Thereafter, print data is transmitted from the short-distance wireless communication portion 200 at the portable communication terminal 1 (or 60, 60B) to the short-distance wireless communication portion 210 at the printer 20 (or 30), whereby printing is carried out.

In the illustrative example, the wireless link establishment request is transmitted from the portable communication terminal 1 (or 60, 60B) to the printer 20 (or 30). Conversely, it is possible that the printer 20 (or 30) transmits the wireless link establishment request to the portable communication terminal 1 (or 60, 60B). However, in this case, it is necessary to provide instruction means for supplying an instruction for transmitting a wireless link establishment request to the printer 20 (or 30) or input means for inputting a password for authentication connection at the printer 20 (or 30). As the instruction means, although it is considered that the user depressed a print button 15 provided at the printer 20 (or 30), for example, in general, the printer does not comprise an input device for ten numeric keys. Thus, there occurs a necessity of additionally providing input means for inputting a password, which is not realistic.

Figure 28A:
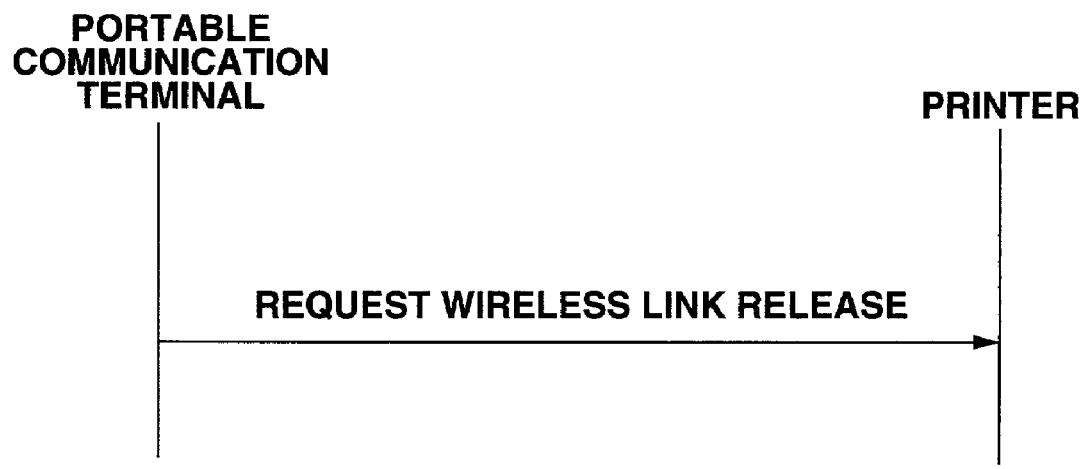
FIGS. 28A and 28B are sequence charts showing examples of procedures for disconnecting (releasing) a wireless link.
Figure 28B:
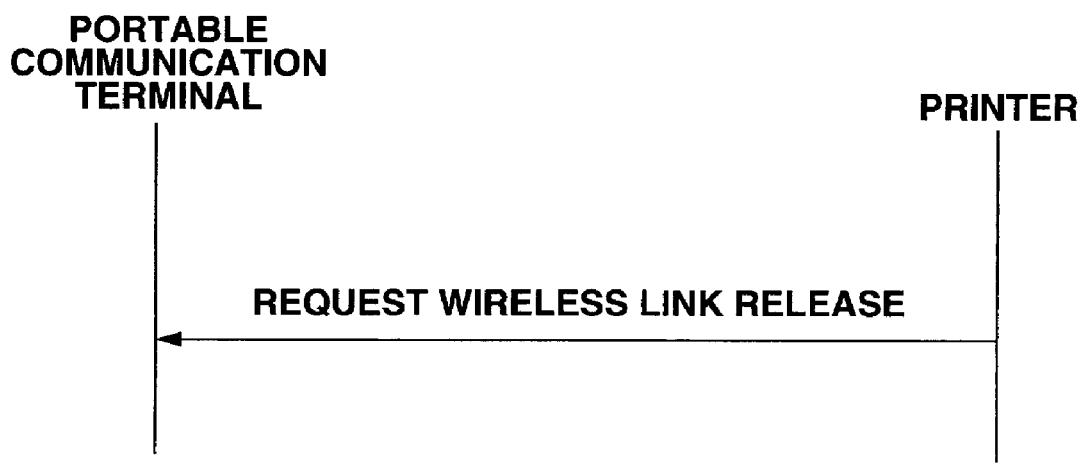

FIG. 28A and FIG. 28B are sequence charts each showing an example of procedures for disconnection (releasing) a wireless link. FIG. 28A shows an example wherein a wireless link release request is transmitted from the short-distance wireless communication portion at the portable communication terminal to the short-distance wireless communication portion at the printer, thereby disconnecting a wireless link. FIG. 28B shows an example wherein a wireless link release request is transmitted from the short-distance wireless communication portion at the printer to the short-distance wireless communication portion at the portable communication terminal, thereby disconnecting a wireless link.

FIG. 29 is a sequence chart showing an execution timing of establishing and disconnecting a wireless link shown in FIGS. 27 and 28 in the first embodiment (FIG. 7). In addition, although the first embodiment has described an example wherein the user depressed a print button 15 provided at the printer 20, thereby printing is started, FIG. 29 shows an example wherein a predetermined button of the portable communication terminal 1 (or 60, 60B) is depressed, thereby printing is started. In the case of wireless communication as well, the print button 15 of the printer 20 is pressed, thereby making it possible to start printing. However, in consideration of a case in which the printer 20 and the portable communication terminal 1 (or 60, 60B) are distant from each other or a case in which the user operates the portable communication terminal 1 (or 60, 60B) by a print data registration work for a server prior to actually starting printing, it is more usable for the user to press a button at the portable communication terminal 1 (or 60, 60B), whereby printing is started.

Figure 30:
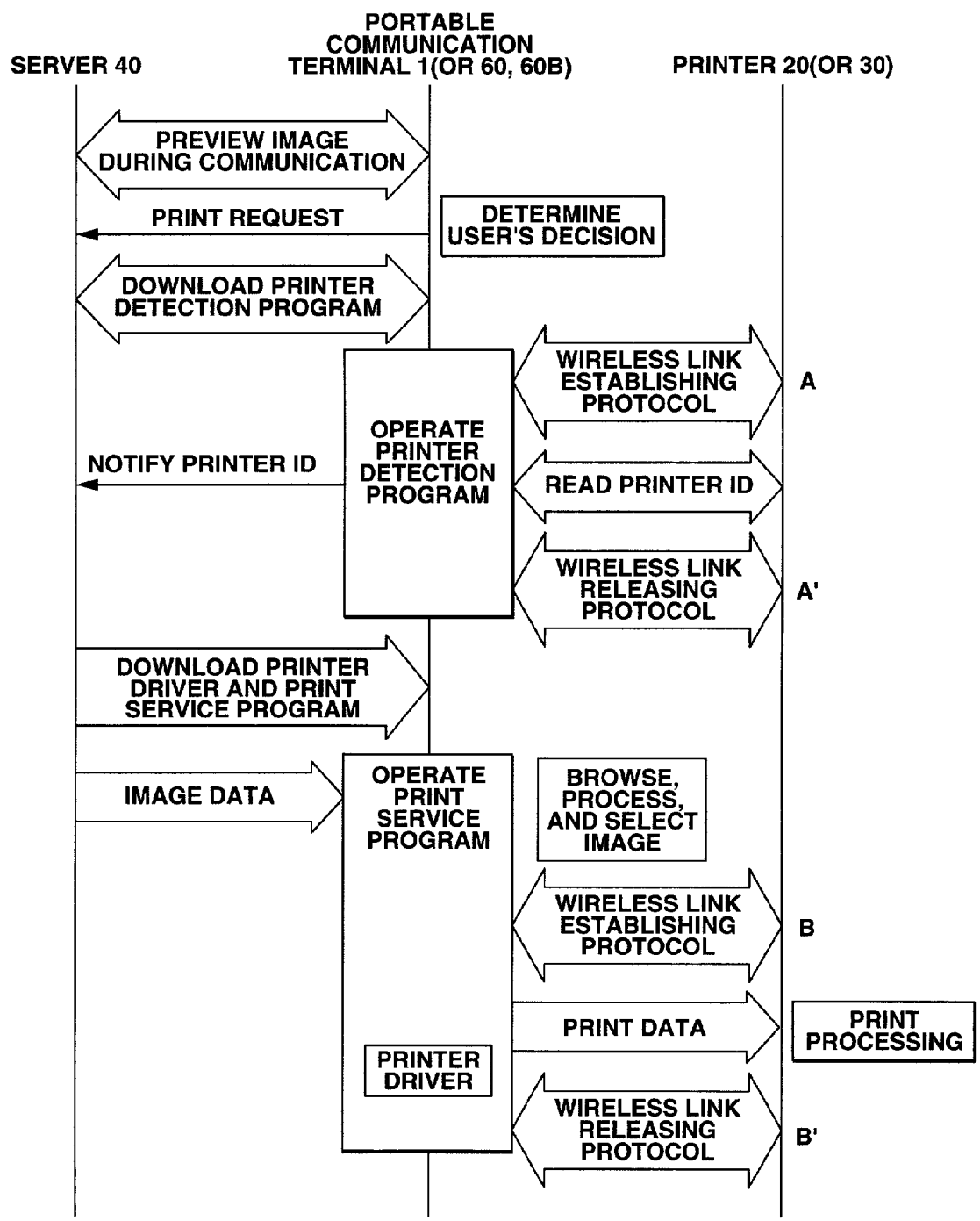
FIG. 30 is a sequence chart showing an execution timing of establishing and disconnecting a wireless link shown in FIGS. 27 and 28 in the case of the fourth embodiment (FIG. 25)

FIG. 30 is a sequence chart showing an execution timing of establishing and disconnecting a wireless link shown in FIGS. 27 and 28 in the fourth embodiment (FIG. 25). In the illustrative embodiment, wireless link establishment processing is carried out twice at a timing A and a timing B. This is because a wireless link is disconnected while the user is browsing or processing an image, whereby an effect that power consumption of the mobile telephone 60B or printer 30 can be saved is expected. If an operation response is prioritized, it may be sufficient if wireless link establishment processing is carried out only once. In this case, a wireless link is established at the timing A shown in FIG. 30, and such link may be maintained up to the timing B'. Namely, link disconnecting processing at the timing A' and link establishment processing at the timing B is not carried out.

SIXTH EMBODIMENT

Figure 31:
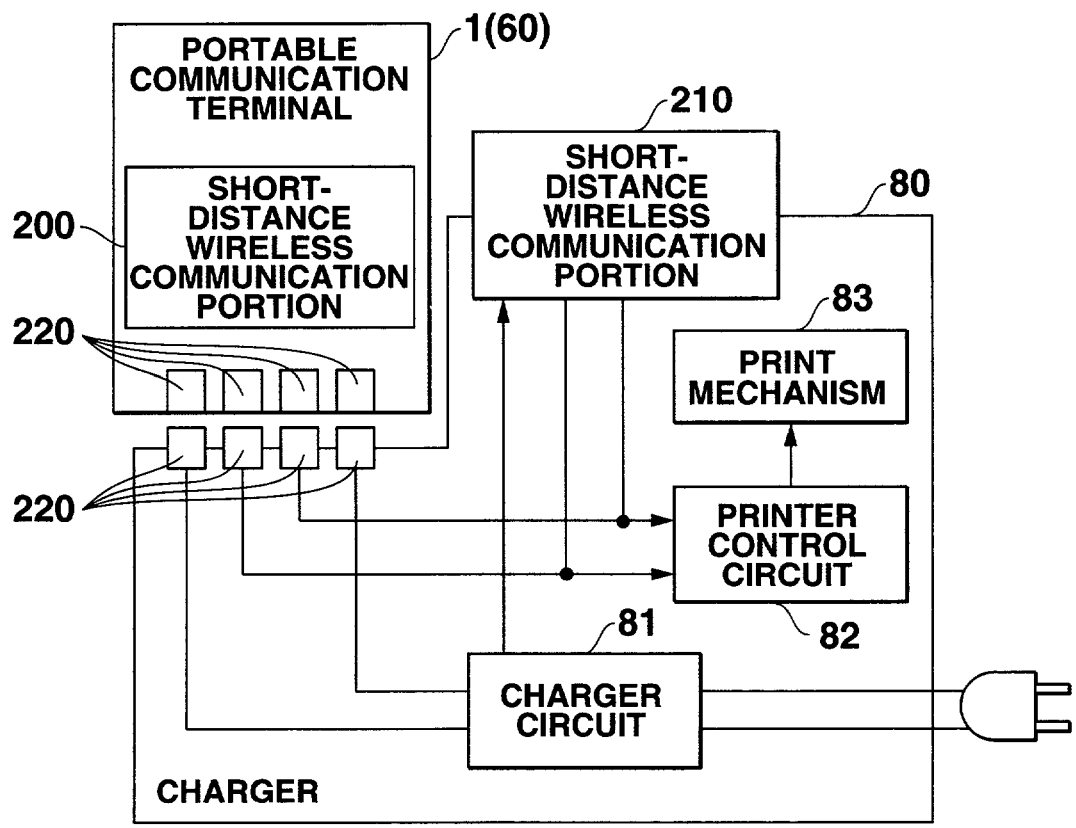
FIG. 31 is a block diagram showing a schematic configuration of a charger having a printer according to the sixth embodiment of the present invention.
Figure 32:
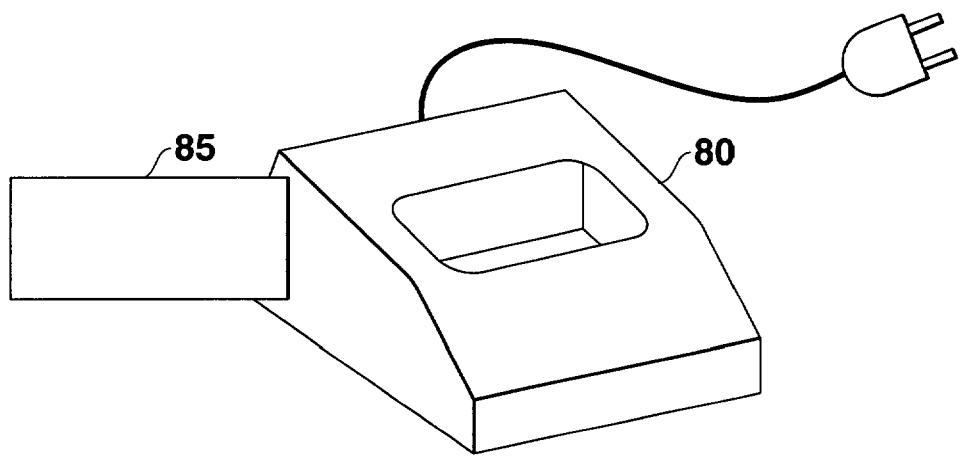
FIG. 32 is a perspective view showing an external view of the charger.

Now, the sixth embodiment of the present invention will be described here. The sixth embodiment is applicable to the first to fifth embodiments, and wherein a printer is provided at a charger of a portable communication terminal. FIG. 31 is a block diagram showing a schematic configuration of a charger having a printer. FIG. 32 is a perspective view showing an external view of the charger. A charger 80 comprises a charger circuit 81, printer control circuit 82, a print mechanism 83, and a short-distance wireless communication portion 210. The charger circuit 81 rectifies a commercially available power supply, converts the rectified voltage into a predetermined direct current voltage, and charges a secondary battery (not shown) incorporated in the portable communication terminal 1 (or 60, 60B) placed on the charging base. The printer control circuit 82 prints the print data on a predetermined form by controlling the print mechanism 83. As shown in FIG. 32, the printed form 85 is ejected from the side (or top or front face) of the charger 80. The short-distance wireless communication portion 210 establishes a wireless link with the portable communication terminal 1 (or 60, 60B), thereby making data communication, as described in the fifth embodiment. In this case, the portable communication terminal 1 (or 60, 60B) as well comprises a short-distance wireless communication portion 200, as described previously.

In the sixth embodiment, if the portable communication terminal 1 (or 60, 60B) is placed on the charge base 80, the print data transmitted from the portable communication terminal 1 (or 60, 60B) is received via an I/F 220. Alternatively, if the portable communication terminal 1 (or 60, 60B) is not placed on the charge base 80, a wireless link is established by the short-distance wireless communication portion 200 of the portable communication terminal 1 (or 60, 60B) and the short-distance wireless communication portion 210 of the charger 80, print data is received by the wireless link, the print mechanism 83 is controlled by the printer control circuit 82, and the data is printed on a predetermined form.

In the second, third, and fourth embodiments, it is desirable to produce a software that achieve a variety of functions in the mobile telephone 60B and a variety of programs (including a printer detection program, a print service program, and a printer driver) downloaded from the print support service server 40 in a Java language capable of operating the same program between devices with different platforms. In this way, the programs are produced in the Java language, thereby making it possible to share the variety of programs (including a printer driver) in common without considering a difference from the mobile telephone 60B.

In addition, in the first to sixth embodiments, although a mobile telephone has been used as a portable communication terminal, the present invention is applicable to any other data processing terminal without being limited thereto. In particular, the present invention is effective for use in a simplified data processing terminal capable of being portable. The other data processing terminal may be used after connected to Internet instead of being connected to a mobile communication network.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A print method comprising:
   connecting a portable communication terminal to a server through a network;
   displaying, on the portable communication terminal, thumbnails corresponding to prestored images on the server that were pre-stored by a device other than the portable communication terminal;
   selecting, at the portable communication terminal, at least one of the thumbnails;
   transmitting, from the portable communication terminal to the server, a registration command for relating the at least one prestored image corresponding to the at least one selected thumbnail with a caller's number of the portable communication terminal, and storing the at least one selected image in association with the related caller's number of the portable communication terminal on the server;
   disconnecting the portable communication terminal from the server;
   connecting a printer to the server through the portable communication terminal, when it is determined that a print command has been issued at the printer;
   transmitting a download request from the printer to the server after the print command has been issued;
   receiving at the printer the at least one image stored in association with the related caller's number of the portable communication terminal, which is transmitted from the server in response to the download request; and
   printing at the printer the at least one received image.

2. A print system comprising:
   means for connecting a portable communication terminal to a server through a network;
   means for acquiring a caller's number of the portable communication terminal, when the portable communication terminal accesses the server;
   means for displaying, on the portable communication terminal, thumbnails corresponding to prestored images on the server that were prestored by a device other than the portable communication terminal;
   means for selecting, at the portable communication terminal, at least one of the thumbnails;
   means for relating, at the server, the at least one selected prestored image with the caller's number of the portable communication terminal and for storing the at least one selected image in association with the caller's number of the portable communication terminal;
   means for disconnecting the portable communication terminal from the server;
   means for connecting a printer to the server through the portable communication terminal when a print command is issued at the printer;
   means for transmitting a download request from the printer to the server after the print command has been issued;
   means for receiving the at least one image stored in association with the related caller's number of the portable communication terminal, which is transmitted from the server in response to the download request; and
   means for controlling the printer to print the at least one received image.

* * * * *